US008553111B2

(12) United States Patent
Tsuruoka

(10) Patent No.: US 8,553,111 B2
(45) Date of Patent: Oct. 8, 2013

(54) NOISE REDUCTION SYSTEM, IMAGE PICKUP SYSTEM AND COMPUTER READABLE STORAGE MEDIUM

(75) Inventor: Takao Tsuruoka, Machida (JP)

(73) Assignee: Olympus Corporation (JP)

(*) Notice: Subject to any disclaimer, the term of this patent is extended or adjusted under 35 U.S.C. 154(b) by 0 days.

(21) Appl. No.: 12/778,440

(22) Filed: May 12, 2010

(65) Prior Publication Data
US 2010/0220223 A1 Sep. 2, 2010

Related U.S. Application Data

(63) Continuation of application No. PCT/JP2008/070826, filed on Nov. 10, 2008.

(30) Foreign Application Priority Data

Nov. 16, 2007 (JP) ................................. 2007-297960

(51) Int. Cl.
H04N 5/217 (2011.01)
H04N 9/64 (2006.01)
H04N 5/00 (2011.01)

(52) U.S. Cl.
USPC ............................ 348/242; 348/241; 348/607

(58) Field of Classification Search
USPC ................................................ 348/241–251
See application file for complete search history.

(56) References Cited

U.S. PATENT DOCUMENTS

| 6,781,625 | B2* | 8/2004 | Hayashi | 348/252 |
| 2003/0174223 | A1* | 9/2003 | Hayashi | 348/241 |
| 2005/0259166 | A1* | 11/2005 | Tsuda et al. | 348/241 |
| 2006/0038899 | A1* | 2/2006 | Tamaru et al. | 348/241 |
| 2006/0066736 | A1 | 3/2006 | Tsuruoka | |
| 2006/0227227 | A1 | 10/2006 | Tsuruoka | |
| 2007/0188634 | A1* | 8/2007 | Takei | 348/241 |
| 2007/0291178 | A1* | 12/2007 | Chao et al. | 348/607 |

FOREIGN PATENT DOCUMENTS

| CN | 1010444750 | 9/2007 |
| EP | 1 605 403 | 12/2005 |
| JP | 9-233369 | 9/1997 |
| JP | 2003-069901 | 3/2003 |
| JP | 2005-318126 | 11/2005 |

(Continued)

OTHER PUBLICATIONS

Supplementary European Search Report issued on Jun. 28, 2012 for corresponding European Application No. EP 08 84 9607.

(Continued)

Primary Examiner — Roberto Velez
Assistant Examiner — Pritham Prabhakher
(74) Attorney, Agent, or Firm — Ostrolenk Faber LLP

(57) ABSTRACT

A noise reduction system for performing noise reduction processing for an image signal taken in from an image pickup system, includes a local area extracting unit which sequentially extracts, from the image signal, a local area including a target pixel for which the noise reduction processing is performed; a first noise reducing unit which performs random noise reduction processing for the local area; a second noise reducing unit which performs impulsive noise reduction processing for the local area; and a combining unit which combines an image signal which has been subjected to the noise reduction processing by the first noise reducing unit and an image signal which has been subjected to the noise reduction processing by the second noise reducing unit.

32 Claims, 27 Drawing Sheets

(56) References Cited

FOREIGN PATENT DOCUMENTS

| JP | 2006-005663 | 1/2006 |
|---|---|---|
| JP | 2007-028026 | 2/2007 |
| JP | 2007-110445 | 4/2007 |

OTHER PUBLICATIONS

Rui, Li et al., "A Hybrid Filter for the Cancellation of Mixed Gaussian Noise and Impulse Noise", Information, Communications and Signal Processing and Fourth Pacific Rim Conference on Multimedia, vol. 1, pp. 508-512, Dec. 15, 2003.

Chui, C. et al., "A Universal Noise Removal Algorithm With an Impulse Detector", IEEE Transactions on Image Processing, vol. 14, No. 11, pp. 1747-1754, Nov. 1, 2005.

Eduardo Abreu et al., "A New Efficient Approach for the Removal of Impulse Noise from Highly Corrupted Images", IEEE Transactions on Image Processing, vol. 5, No. 6, pp. 1012-1013, Jun. 1, 1996.

Office Action received from the Chinese Patent Office dated Dec. 16, 2011 for corresponding Chinese application No. 200880116240.0.

International Search Report and Written Opinion mailed Feb. 24 2010 in corresponding PCT International Application No. PCT/JP2008/070826.

\* cited by examiner

ARRAY OF BAYER TYPE PRIMARY COLOR FILTER

SEPARATION TO R, Gr, Gb, B SIGNALS

ARRAY OF COLOR DIFFERENCE LINE SEQUENTIAL COMPLEMENTARY FILTER

FIG. 2C

SEPARATION TO Mg, G, Ye, Cy SIGNALS

FIG. 2D

RELATIONSHIP OF NOISE AMOUNT TO SIGNAL LEVEL

SIMPLIFICATION OF NOISE MODEL

CALCULATION METHOD OF NOISE AMOUNT FROM SIMPLIFIED NOISE MODEL

FLOW OF ENTIRE PROCESSING

COLOR DIFFERENCE LINE SEQUENTIAL COMPLEMENTARY FILTER ARRAY

LOCAL AREA OF EVEN NUMBER FIELD SIGNAL

LOCAL AREA OF ODD NUMBER FIELD SIGNAL

NOISE REDUCTION SYSTEM, IMAGE PICKUP SYSTEM AND COMPUTER READABLE STORAGE MEDIUM

CROSS-REFERENCE TO RELATED APPLICATIONS

This application is a continuation of International Patent Application No. PCT/JP2008/070826, filed on Nov. 10, 2008, which claims the benefit of Japanese Patent Application No. JP2007-297960, filed on Nov. 16, 2007, which is incorporated by reference as if fully set forth.

TECHNICAL FIELD

The present invention relates to noise reduction processing for reducing random and impulsive noises of an image signal caused by an image pickup system.

BACKGROUND ART

An image signal obtained from an image pickup system configured by an image pickup element, an associated analog circuit, an A/D converter and the like contains a noise component in general. This noise component can be roughly divided into a random noise and an impulsive noise. The random noise is generated in the image pickup element and the analog circuit and has a characteristic close to a white noise characteristic. On the other hand, the impulsive noise is a noise mainly caused by the image pickup element and represented by a defective pixel or the like.

With regard to random and impulsive noise reduction processing, for example, JP2007-110445A discloses a technique in which an image signal is photographed several times, the result is recorded in a plurality of frame memories, and the maximum value and the minimum value are removed and averaged or a median is taken in relation to the image signal on the same coordinate. As a result, a random noise and an extrinsic impulsive noise, which is not fixed as a defective pixel, can be removed, and a high-quality image signal can be obtained.

Also, as shown in JP2005-318126A, an example in which a random noise amount and an impulsive noise amount are estimated and noise reduction is performed in single reduction processing common to the both noises is disclosed. As a result, the random noise and the impulsive noise can be removed, and a high-quality image signal can be obtained. Also, since noise reduction is performed in single reduction processing, noise reduction processing with less occurrence of discontinuity or artifact caused by the noise reduction processing can be realized.

Moreover, with regard to the reduction processing of a defective pixel, for example, JP2003-69901A, discloses a technique in which after correction or generation processing is performed in relation to a defective pixel measured in advance, a plurality of noise reduction processing results such as a low-pass filter or a median filter are weighted and added. As a result, occurrence of discontinuity or artifact caused by correction or generation processing of a defective pixel can be suppressed, and a high-quality image signal can be obtained.

SUMMARY OF INVENTION

According to an aspect of the present invention, a noise reduction system for performing noise reduction processing for an image signal taken in from an image pickup system, is provided. The noise reduction system includes a local area extracting unit which sequentially extracts, from the image signal, a local area including a target pixel for which the noise reduction processing is performed; a first noise reducing unit which performs random noise reduction processing for the local area; a second noise reducing unit which performs impulsive noise reduction processing for the local area; and a combining unit which combines an image signal subjected to the noise reduction processing by the first noise reducing unit and an image signal subjected to the noise reduction processing by the second noise reducing unit.

According to another aspect of the present invention, a computer readable storage medium stored with a noise reduction program for causing a computer to execute noise reduction processing for an image signal taken in from an image pickup system, is provided. The computer program includes a local area extraction step for sequentially extracting a local area including a target pixel for which noise reduction processing is to be performed from the image signal; a first noise reduction step for performing random noise reduction processing for the local area; a second noise reduction step for performing impulsive noise reduction processing for the local area; and a combination step for combining an image signal subjected to the noise reduction processing at the first noise reduction step and an image signal subjected to the noise reduction processing at the second noise reduction step.

BRIEF DESCRIPTION OF DRAWINGS

FIGS. 2A to 2D are explanatory diagrams concerning arrangement of a color filter and a local area.

DESCRIPTION OF EMBODIMENTS

Embodiments of the present invention will be described below referring to the attached drawings.

First Embodiment

[Configuration]

Figure 1:
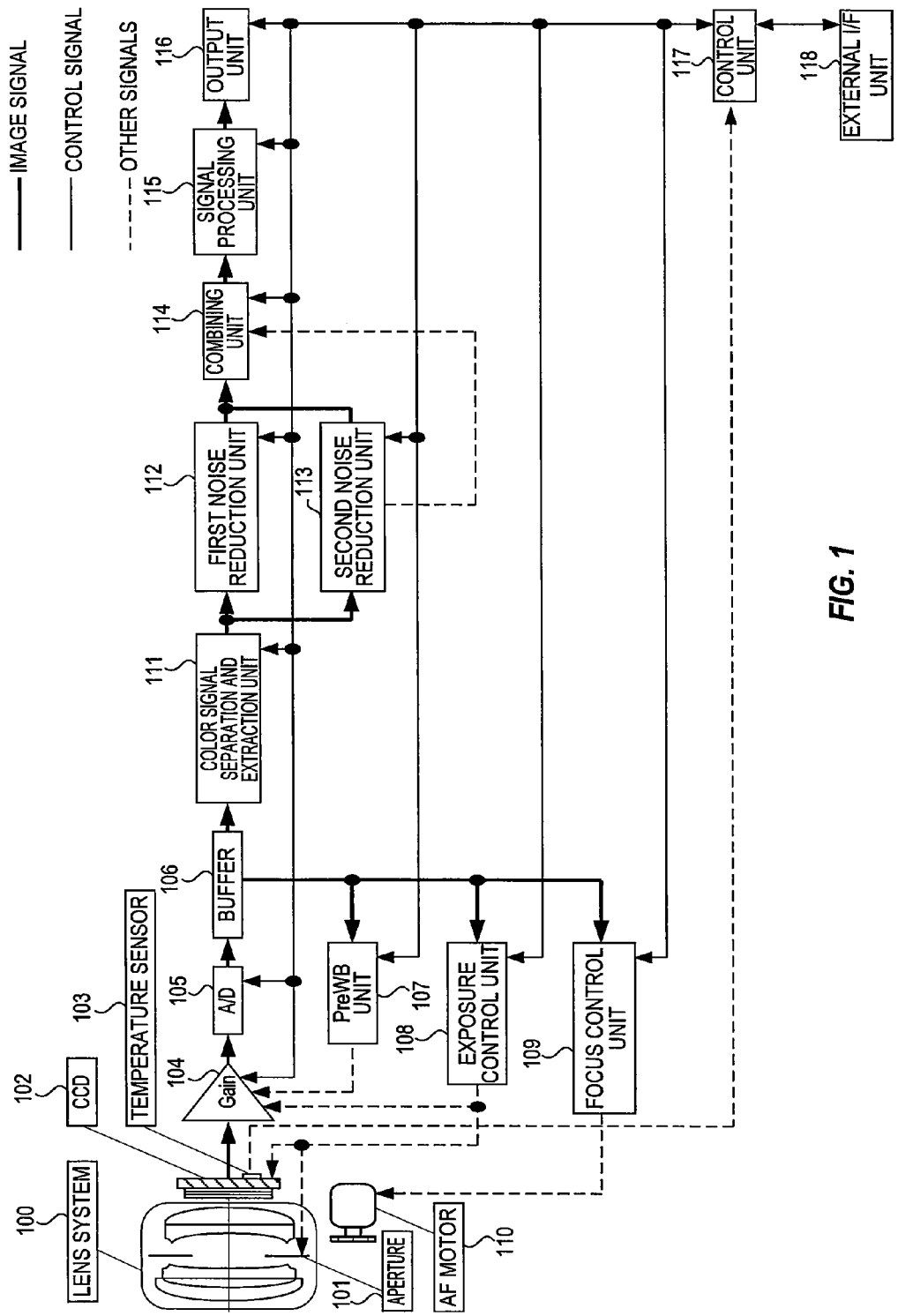
FIG. 1 is a configuration diagram of a first embodiment.

FIG. 1 is a configuration diagram of a first embodiment. An image signal photographed through a lens system 100, an aperture 101, and a CCD 102 is amplified at an amplifier (hereinafter referred to as "Gain") 104 and converted to a digital signal at an A/D converter (hereinafter referred to as an "A/D") 105. The image signal from the A/D 105 is transferred to a color signal separation and extraction unit 111 through a buffer 106.

The buffer 106 is also connected to a pre white balance adjustment unit (hereinafter referred to as a "PreWB unit") 107, an exposure control unit 108, and a focus control unit 109. The PreWB unit 107 is connected to the Gain 104, the exposure control unit 108 to the aperture 101, the CCD 102, and the Gain 104, and the focus control unit 109 to an AF motor 110. The color signal separation and extraction unit 111 is connected to a first noise reduction unit 112 and a second noise reduction unit 113. The first noise reduction unit 112 and the second noise reduction unit 113 are connected to an output unit 116 such as a memory card through a combining unit 114 and a signal processing unit 115.

A control unit 117 such as a microcomputer is bidirectionally connected to the Gain 104, the A/D 105, the PreWB unit 107, the exposure control unit 108, the focus control unit 109, the color signal separation and extraction unit 111, the first noise reduction unit 112, the second noise reduction unit 113, the combining unit 114, the signal processing unit 115, and the output unit 116. Also, an external I/F unit 118 provided with a power switch, a shutter button, and an interface for performing setting to switch between various types of photographic modes is connected to the control unit 117 bidirectionally. Moreover, a signal from a temperature sensor 103 arranged in the vicinity of the CCD 102 is connected to the control unit 117.

[Action]

In FIG. 1, a flow of an image signal will be described. After shooting conditions such as ISO sensitivity is set through the external I/F unit 118, by half-pressing the shutter button, a pre shooting mode starts. The image signal photographed through the lens system 100, the aperture 101, and the CCD 102 is outputted as an analog signal. In the first embodiment, a single CCD in which Bayer type primary color filter is arranged on the front face is assumed as the CCD 102.

Figure 2A:
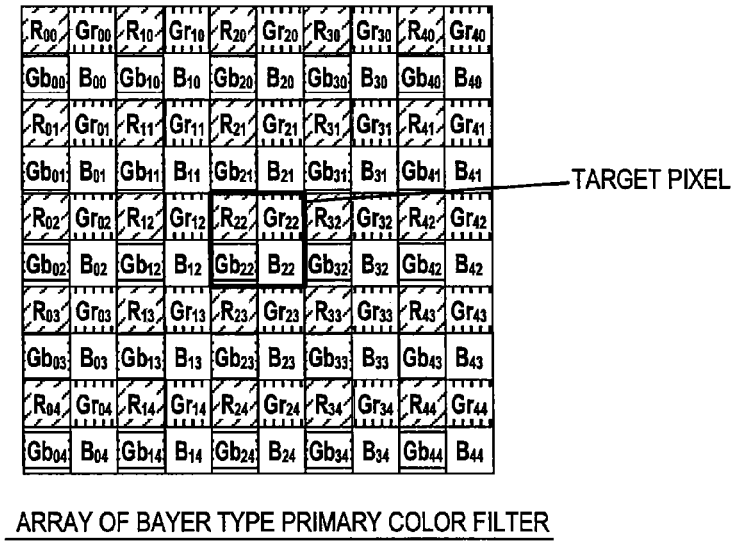

FIG. 2A shows a configuration of the Bayer type primary color filter. The Bayer type has a basic unit of 2×2 pixels, in which one pixel each of red (R) and blue (B) filters and two pixels of green (Gr, Gb) filters are arranged. The green filters have the same characteristics but they are distinguished to Gr and Gb for convenience of processing in the first embodiment.

The above analog signal is amplified by a predetermined amount in the Gain 104, converted to a digital signal at the A/D 105 and transferred to the buffer 106. The image signal in the buffer 106 is transferred to the PreWB unit 107, the exposure control unit 108, and the focus control unit 109 on the basis of control by the control unit 117.

At the PreWB unit 107, a simplified white balance coefficient is calculated by multiplying a signal at a predetermined level by each color signal corresponding to a color filter. The coefficient is transferred to the Gain 104, and a different gain is multiplied for each color signal so that white balance is taken.

At the exposure control unit 108, considering set ISO sensitivity, shutter speed at an image stability limit and the like, the aperture 101 and electronic shutter speeds of the CCD 102, an amplification rate of the Gain 104 and the like are controlled so as to have an appropriate exposure.

Also, at the focus control unit 109, by detecting edge intensity in the image signal and controlling the AF motor 110 so that the intensity becomes the maximum, a focusing signal is obtained.

Subsequently, by fully pressing the shutter button through the external I/F unit 118, real shooting is performed, and the image signal is transferred to the buffer 106 similarly to pre shooting. The real shooting is performed on the basis of the simplified white balance coefficient acquired at the PreWB unit 107, an exposure information acquired at the exposure control unit 108, and a focus information acquired at the focus control unit 109, and the information at the shooting is transferred to the control unit 117. Also, the image signal in the buffer 106 is transferred to the color signal separation and extraction unit 111.

The color signal separation and extraction unit 111 sequentially extracts a local area made up of a target pixel to be a target of the subsequent noise reduction processing and a neighboring pixels located in the vicinity of the target pixel on the basis of the control by the control unit 117 for each color signal. In the first embodiment, 10×10 pixels shown in FIG. 2A, for example, are extracted from the image signal as a basic unit. In this case, target pixels to be targets of the noise reduction processing are four pixels, that is, $R_{22}$, $Gr_{22}$, $Gb_{22}$, and $B_{22}$.

Figure 2B:
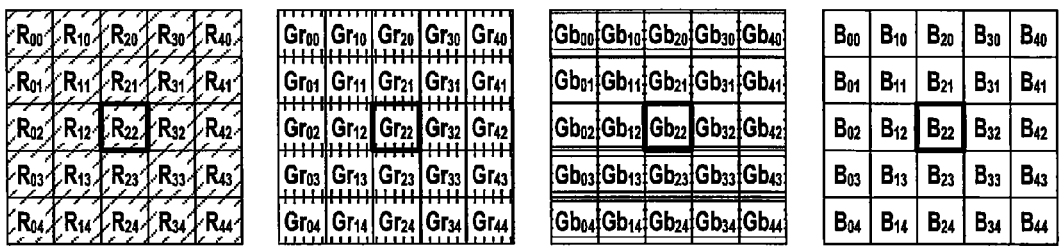

Subsequently, a local area of 5×5 pixels is separated for each color filter of R, Gr, Gb, and B as shown in FIG. 2B. In the following, a pixel in the local area is expressed as $C_{ij}$ (C is a color signal and C=R, Gr, Gb, and B, i is x-coordinate and i=0 to 4, and j is y-coordinate and j=0 to 4). In the case of the local area of 5×5 pixels, the target pixel is $C_{22}$. In order to extract all the target pixels from the image signal, the basic unit of 10×10 pixels shown in FIG. 2A is sequentially extracted in four rows and four columns overlapping manner. The extracted local area is transferred to the first noise reduction unit 112 and the second noise reduction unit 113.

The first noise reduction unit 112 estimates a random noise amount $N_{22}$ relating to the target pixel $C_{22}$ from a low frequency component of the local area on the basis of the control of the control unit 117. After that, using the low frequency component of the local area and the estimated noise amount $N_{22}$, coring processing is applied to the target pixel $C_{22}$ so as to perform random noise reduction processing. In the following, the target pixel subjected to the random noise reduction processing at the first noise reduction unit 112 is described by $C^{N1}_{22}$. The target pixel $C^{N1}_{22}$ subjected to the random noise reduction processing is transferred to the combining unit 114.

On the other hand, the second noise reduction unit 113 calculates an index coefficient IC indicating a degree of an impulsive noise from the local area on the basis of the control of the control unit 117 for the target pixel $C_{22}$ and its neighboring eight pixels $C_{11}, C_{21}, C_{31}, C_{12}, C_{32}, C_{13}, C_{23}$, and $C_{33}$. In the following, the index coefficient of the target pixel $C_{22}$ is noted as $IC_0$, the index coefficients of the neighboring eight pixels as $IC_1$ to $IC_8$, and the entire index coefficients as $IC_k$ (k=0 to 8). Also, the target pixel $C_{22}$ is noted as $C_0$, the neighboring eight pixels as $C_1$ to $C_8$, and all the nine pixels as $C_k$ in a simplified manner as necessary.

After that, weighting coefficients of the target pixel and the neighboring eight pixels are acquired using the index coefficient $IC_k$, and weighting filtering processing is applied so as to perform the impulsive noise reduction processing. In the following, the target pixel subjected to the impulsive noise reduction processing at the second noise reduction unit 113 is described by $C^{N2}_{22}$. The index coefficient $IC_0$ of the target pixel $C_{22}$ and the target pixel $C^{N2}_{22}$ subjected to the impulsive noise reduction processing are transferred to the combining unit 114.

The combining unit 114 performs combination processing of the target pixel $C^{N1}_{22}$ subjected to the random noise reduction processing at the first noise reduction unit 112 and the target pixel $C^{N2}_{22}$ subjected to the impulsive noise reduction processing, using the index coefficient $IC_0$ transferred from the second noise reduction unit 113, on the basis of the control of the control unit 117 so as to acquire the target pixel $C^N_{22}$ after the combination:

$$C^N_{22} = C^{N1}_{22} (IC_0 \leq Th1)$$

$$C^N_{22} (1-w) \cdot C^{N1}_{22} w \cdot C^{N2}_{22} (Th1 < IC_0 < Th2)$$

$$C^N_{22} = C^{N2}_{22} (Th2 \leq IC_0) \quad (1)$$

where Th1 and Th2 refer to predetermined threshold values, and w=0 to 1 to a combination coefficient for combination.

The target pixel $C^N_{22}$ after the combination is transferred to the signal processing unit 115. The processing at the color signal separation and extraction unit 111, the first noise reduction unit 112, the second noise reduction unit 113, and the combining unit 114 is performed in synchronization by the unit of local area on the basis of the control at the control unit 117.

At the signal processing unit 115, on the basis of the control of the control unit 117, known interpolation processing, enhancement processing, compression processing and the like are preformed for the image signal subjected to the combination processing after the noise reduction and transferred to the output unit 116.

The output unit 116 records and stores the image signal in a recoding medium such as a magnetic disk and a memory card.

Figure 3:
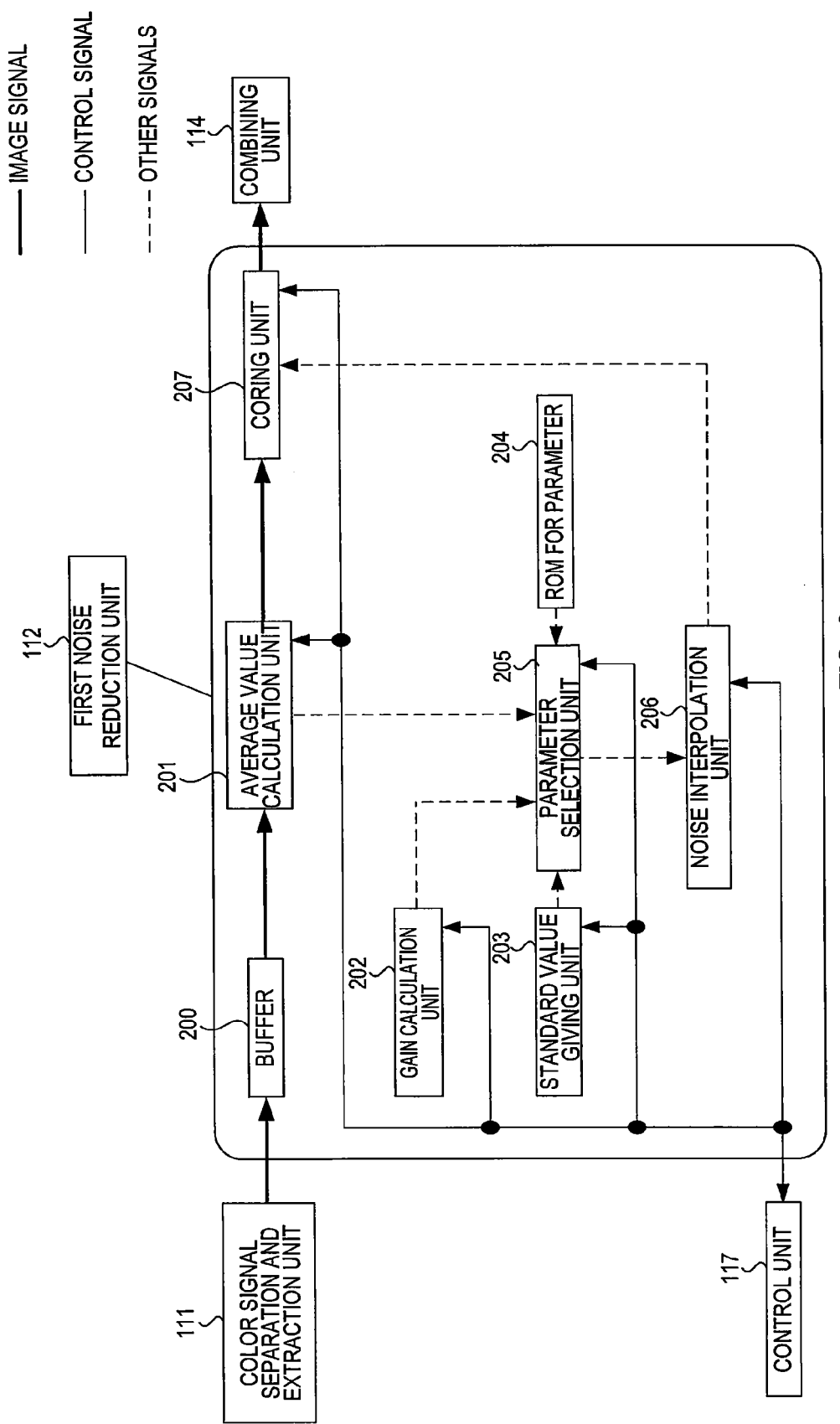
FIG. 3 is a configuration diagram of a first noise reduction unit.

FIG. 3 shows an example of a configuration of the first noise reduction unit 112, which is configured by a buffer 200, an average value calculation unit 201, a gain calculation unit 202, a standard value giving unit 203, a ROM for parameter 204, a parameter selection unit 205, a noise interpolation unit 206, and a coring unit 207.

The color signal separation and extraction unit 111 is connected to the average value calculation unit 201 through the buffer 200. The average value calculation unit 201 is connected to the parameter selection unit 205 and the coring unit 207. The gain calculation unit 202, the standard value giving unit 203, and the ROM 204 for parameter are connected to the parameter selection unit 205. The parameter selection unit 205 is connected to the coring unit 207 through the noise interpolation unit 206. The coring unit 207 is connected to the combining unit 114. The control unit 117 is bidirectionally connected to the average value calculation unit 201, the gain calculation unit 202, the standard value giving unit 203, the parameter selection unit 205, the noise interpolation unit 206, and the coring unit 207.

From the color signal separation and extraction unit 111, as shown in FIG. 2B, the local area of 5×5 pixels is sequentially transferred to the buffer 200 for each color filter of R, Gr, Gb, and B.

The average value calculation unit 201 calculates an average value C_AV (C=R, Gr, Gb, B) of the local area as shown in an equation (2) on the basis of the control of the control unit 117:

$$C\_AV = \frac{\sum_{i,j} C_{ij}}{25} \quad (2)$$

The calculated average value C_AV is transferred to the parameter selection unit 205, and the average value C_AV and the target pixel $C_{22}$ are transferred to the coring unit 207.

The gain calculation unit 202 acquires an amplification amount in the Gain 104 on the basis of the information relating to the ISO sensitivity and exposure information transferred from the control unit 117 and transfers the result to the parameter selection unit 205. Also, the control unit 117 obtains temperature information of the CCD 102 from the temperature sensor 103 and transfers the result to the parameter selection unit 205.

The parameter selection unit 205 estimates a random noise amount $N_{22}$ concerning the target pixel $C_{22}$ on the basis of the average value of the local area from the average value calculation unit 201, the gain information from the gain calculation unit 202, and the temperature information from the control unit 117.

Figure 4A:
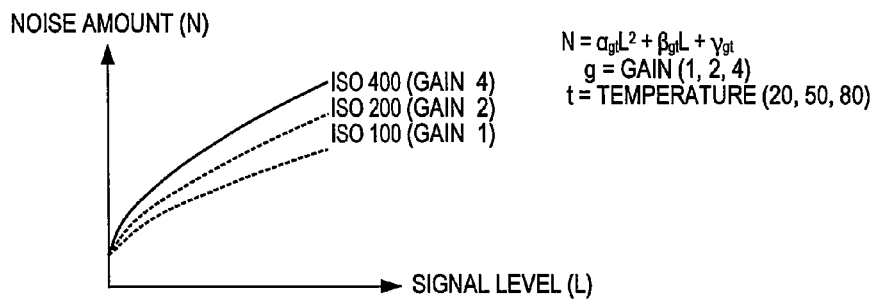
FIGS. 4A to 4C are explanatory diagrams concerning estimation of a noise amount.
Figure 4B:
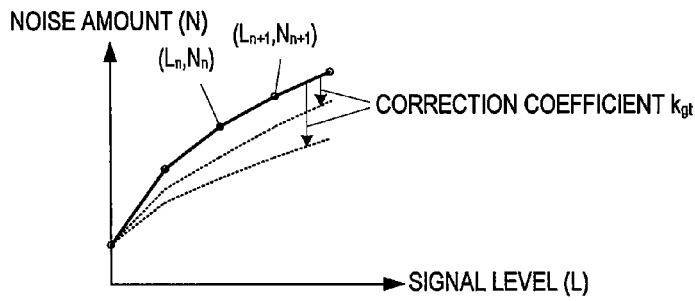
Figure 4C:
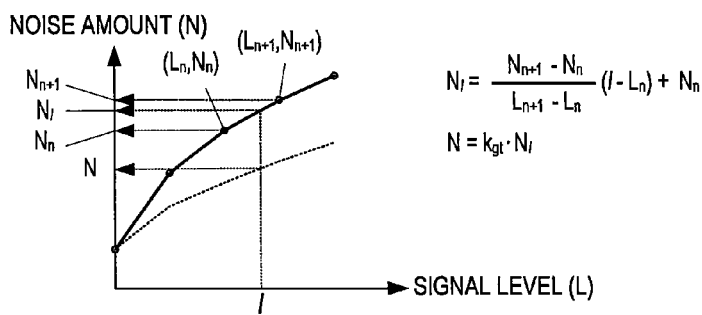

FIGS. 4A to 4C are explanatory diagrams concerning estimation of a random noise amount. FIG. 4A plots a random noise amount N with respect to a signal level L and increases in a quadratic curve to the signal level. By modeling FIG. 4A by a quadratic function, an equation (3) is obtained:

$$N = \alpha L^2 + \beta L + \gamma \quad (3)$$

where $\alpha$, $\beta$, and $\gamma$ are constant terms.

However, the noise amount is changed not only by the signal level but also by a temperature and a gain of an image pickup element. FIG. 4A plots a noise amount to three types of ISO sensitivity, that is, 100, 200, and 400, relating to the gain in a temperature as an example. Each curve shows a form shown in the equation (3), but its coefficient is different depending on the ISO sensitivity relating to the gain. By formulating a model considering the above with the temperature as t and the gain as g, the following equation is obtained:

$$N = \alpha_{gt} L^2 + \beta_{gt} L + \gamma_{gt} \quad (4)$$

where, $\alpha_{gt}$, $\beta_{gt}$, and $\gamma_{gt}$ are constant terms.

However, it is complicated to record the function of the equation (4) several times and calculate the noise amount by calculation each time in terms of processing. Therefore, the model is simplified as shown in FIG. 4B. In FIG. 4B, a model giving the maximum noise amount is selected as a reference noise model and this is approximated by a polygonal line with a predetermined number. An inflection point of the polygonal line is expressed by coordinate data $(L_n, N_n)$ made up of a signal level L and the noise amount N. Here, reference character n denotes the number of the inflection points.

Also, a correction coefficient $k_{gt}$ for deriving another noise model from the above reference noise model is prepared. The correction coefficient $k_{gt}$ is calculated by the method of least square between each noise model and the reference noise model. In order to derive another noise model from the reference noise model, the correction coefficient $k_{gt}$ is multiplied. The coordinate data $(L_n, N_n)$ and the correction coefficient $k_{gt}$ of the reference noise model can be easily obtained by measuring characteristics of the image pickup system in advance. The coordinate data $(L_n, N_n)$ and the correction coefficient $k_{gt}$ of the reference noise model are recorded in the ROM 204 for parameter.

FIG. 4C shows a method of calculating a noise amount from the simplified noise model shown in FIG. 4B. For example, suppose that the noise amount N corresponding to the given signal level 1, the gain g, and the temperature t is to be acquired. First, to which section of the reference noise model the signal level 1 belongs is searched. Here, it is supposed that the level belongs to a section between $(L_n, N_n)$ and $(L_{n+1}, N_{n+1})$. A reference noise amount $N_l$ in the reference noise model is acquired by linear interpolation as follows:

$$N_l = \frac{N_{n+1} - N_n}{L_{n+1} - L_n}(l - L_n) + N_n \quad (5)$$

Subsequently, by multiplying the correction coefficient $k_{gt}$, the noise amount N is acquired as follows:

$$N = k_{gt} \cdot N_l \quad (6)$$

The parameter selection unit 205 sets the signal level 1 from the average value C_AV of the local area from the average value calculation unit 201, the gain g from the gain information from the gain calculation unit 202, and the temperature t from the temperature information from the control unit 117. Subsequently, the coordinate data $(L_n, N_n)$ and $(L_{n+1}, N_{n+1})$ of the section to which the signal level 1 belongs is searched from the ROM 204 for parameter and transferred to the noise interpolation unit 206. Moreover, the correction coefficient $k_{gt}$ is searched from the ROM 204 for parameter and transferred to the noise interpolation unit 206.

The noise interpolation unit 206 calculates the reference noise amount $N_l$ in the reference noise model on the basis of the equation (5) from the signal level 1 and the coordinate data $(L_n, N_n)$ and $(L_{n+1}, N_{n+1})$ from the parameter selection unit 205 on the basis of the control of the control unit 117. After that, the noise amount N is calculated on the basis of the equation (6) from the correction coefficient $k_g$ from the parameter selection unit 205. The calculated noise amount N is transferred to the coring unit 207 as the noise amount $N_{22}$ of the target pixel $C_{22}$ in the case of the local area shown in FIG. 2B.

In the above process of the noise amount calculation, it is not necessary to acquire the information such as the temperature t and the gain g for each shooting. It may be so configured that, by recording arbitrary information in the standard value giving unit 203, the calculation process is omitted. As a result, high-speed processing and power saving can be realized.

The coring unit 207 reads the target pixel $C_{22}$ and the average value C_AV from the average value calculation unit 201 and the noise amount $N_{22}$ from the noise interpolation unit 206 on the basis of the control of the control unit 117, performs coring processing for the target pixel $C_{22}$ so as to acquire the target pixel $C^{N1}_{22}$ subjected to the random noise reduction processing.

$$C^{N1}_{22} = C_{22} - N_{22} (C_{22} \geq C\_AV + N_{22})$$

$$C^{N1}_{22} = C\_AV (C\_AV + N_{22} > C_{22} > C\_AV - N_{22})$$

$$C^{N1}_{22} + N_{22} (C\_AV - N_{22} \geq C_{22}) \quad (7)$$

The target pixel $C^{N1}_{22}$ subjected to the random noise reduction processing is transferred to the combining unit 114.

In the above configuration, the average value calculation is used as a low frequency component in the local area, and the interpolation processing is used for the noise estimation processing, but not limited to such configuration. For example, it may be so configured that low-pass filtering processing is used as a low frequency component of the local area and lookup table is used for the noise estimation processing.

Figure 5:
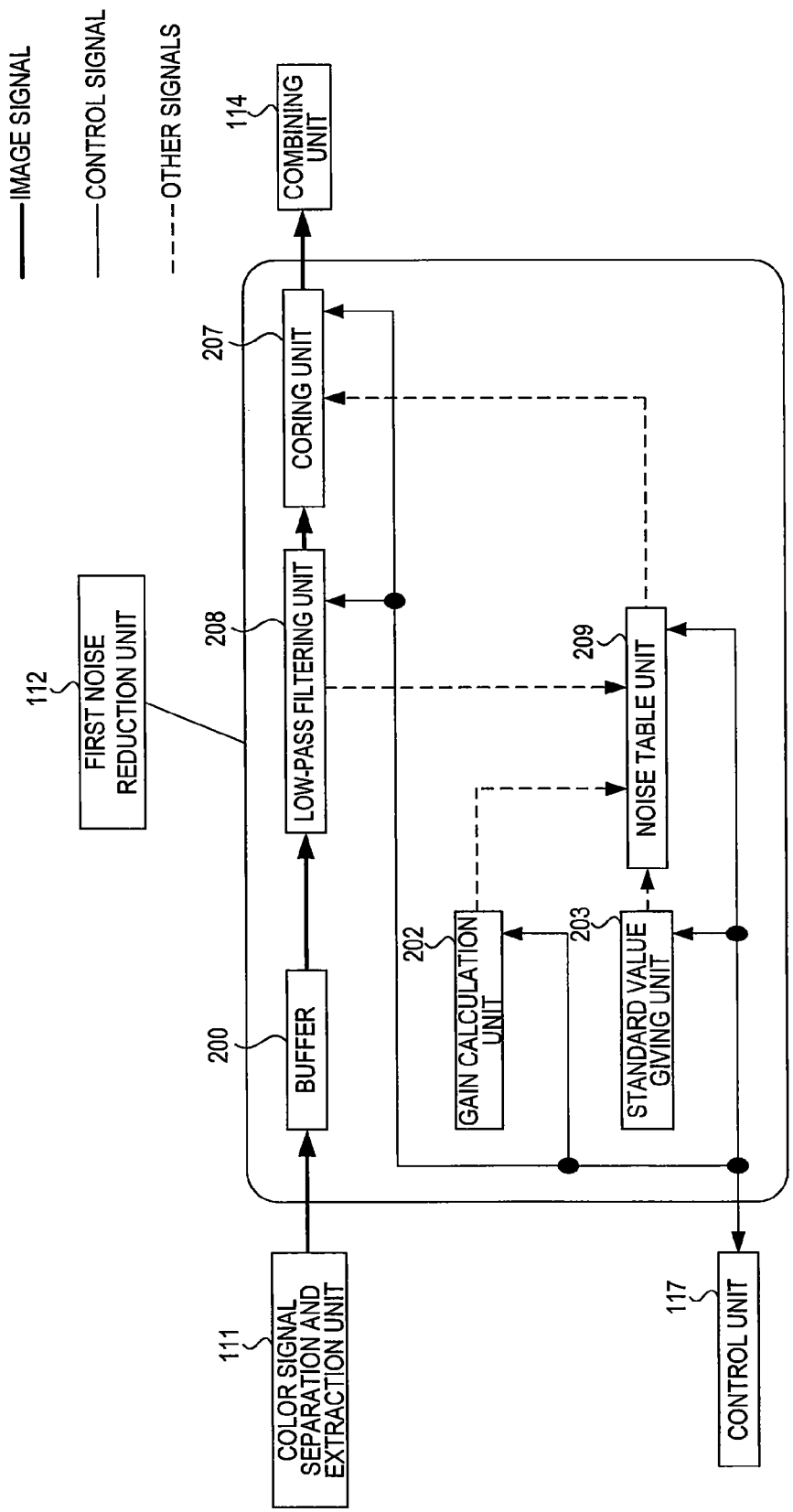
FIG. 5 is a configuration diagram of a first noise reduction unit in another form.

FIG. 5 shows an example of another configuration of the first noise reduction unit 112, in which the average value calculation unit 201, the ROM 204 for parameter, the parameter selection unit 205, and the noise interpolation unit 206 shown in FIG. 3 are deleted, and a low-pass filtering unit 208 and a noise table unit 209 are added. The basic configuration is the same as the first noise reduction unit 112 shown in FIG. 3, and the same names and reference numerals are allocated to the same configurations. Only the different portions will be described below.

The color signal separation and extraction unit 111 is connected to the low-pass filtering unit 208 through the buffer 200. The low-pass filtering unit 208 is connected to the noise table unit 209 and the coring unit 207. The gain calculation unit 202 and the standard value giving unit 203 are connected to the noise table unit 209. The noise table unit 209 is connected to the coring unit 207. The control unit 117 is bidirectionally connected to the low-pass filtering unit 208 and the noise table unit 209.

The low-pass filtering unit 208 performs low-pass filtering processing having a predetermined frequency characteristic for the local area on the basis of the control of the control unit 117 and calculates a low frequency component C_LO (C=R, Gr, Gb, B) of the local area. The calculated low frequency component C_LO is transferred to the noise table unit 209 and the low frequency component C_LO and the target pixel $C_{22}$ are transferred to the coring unit 207. The low frequency component C_LO of the local area from the low-pass filtering unit 208, the gain information from the gain calculation unit 202, and the temperature information from the control unit 117 are transferred to the noise table unit 209.

The noise table unit 209 outputs the noise amount $N_{22}$ of the target pixel $C_{22}$ on the basis of the low frequency component relating to the local area from the low-pass filtering unit 208, the gain information from the gain calculation unit 202, and the temperature information from the control unit 117. The noise table unit 209 is a lookup table recording relationships among the temperature, the signal value level, the gain and the noise amount and is constructed on the basis of relationship shown in the equation (4). The noise amount $N_{22}$ obtained from the noise table unit 209 is transferred to the coring unit 207.

The coring unit 207 reads the target pixel $C_{22}$ and the low frequency component C_LO from the low-pass filtering unit 208 and the noise amount $N_{22}$ from the noise table unit 209 on the basis of the control of the control unit 117, performs the coring processing for the target pixel $C_{22}$ and acquires the target pixel $C^{N1}_{22}$ subjected to the random noise reduction processing. This coring processing is performed by substituting the low frequency component C_LO for the average value C_AV in the equation (7).

Figure 6:
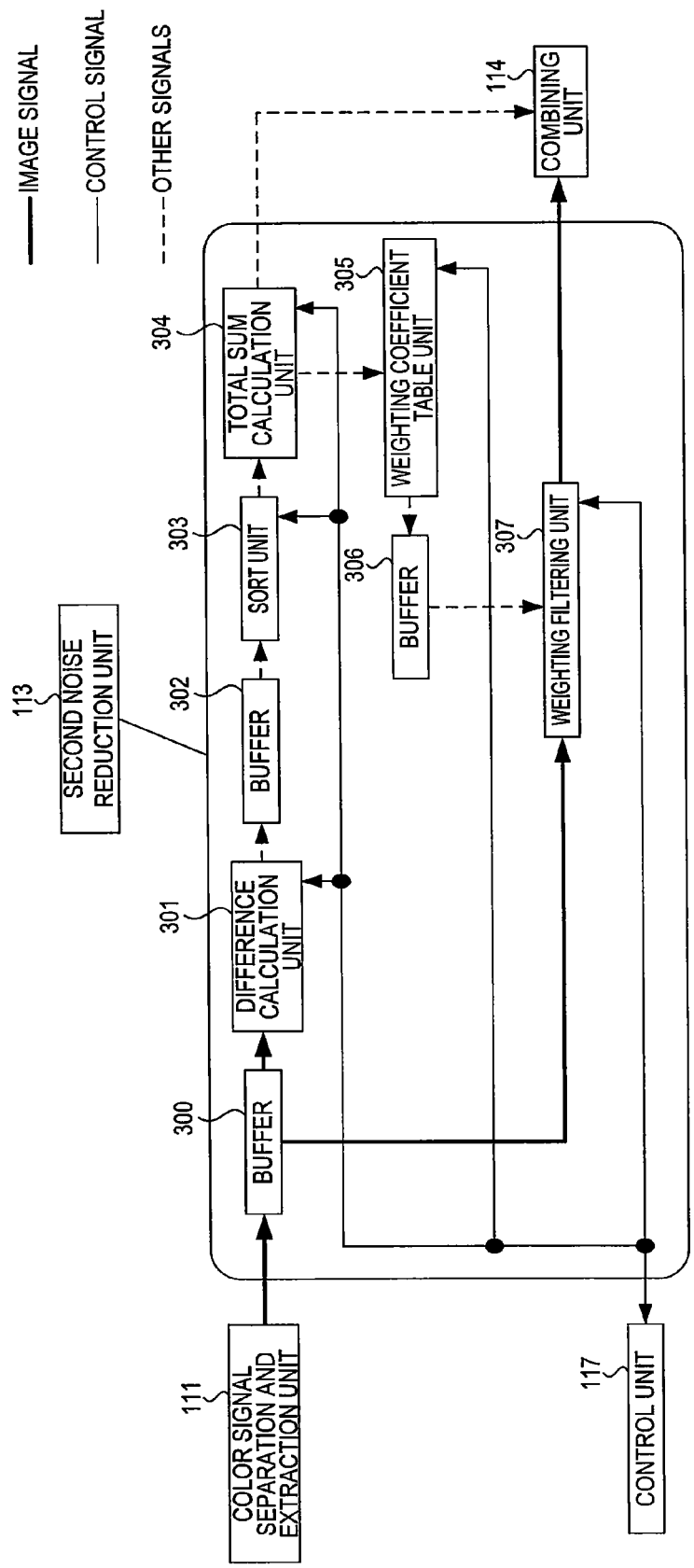
FIG. 6 is a configuration diagram of a second noise reduction unit.

FIG. 6 shows an example of a configuration of the second noise reduction unit 113 and is configured by a buffer 300, a difference calculation unit 301, a buffer 302, a sort unit 303, a total sum calculation unit 304, a weighting coefficient table unit 305, a buffer 306, and a weighting filtering unit 307.

The color signal separation and extraction unit 111 is connected to the difference calculation unit 301 and the weighting filtering unit 307 through the buffer 300. The difference calculation unit 301 is connected to the total sum calculation unit 304 through the buffer 302 and the sort unit 303. The total sum calculation unit 304 is connected to the weighting coefficient table unit 305 and the combining unit 114. The weighting coefficient table unit 305 is connected to the weighting filtering unit 307 through the buffer 306. The weighting filtering unit 307 is connected to the combining unit 114. The control unit 117 is bidirectionally connected to the difference calculation unit 301, the sort unit 303, the total sum calculation unit 304, the weighting coefficient table unit 305, and the weighting filtering unit 307.

From the color signal separation and extraction unit 111, as shown in FIG. 2B, the local area of 5×5 pixels is sequentially transferred to the buffer 300 for each color filter of R, Gr, Gb, and B.

The difference calculation unit 301 calculates absolute values of differences from the neighboring eight pixels for each of the target pixel $C_{22}$ and its neighboring eight pixels $C_{11}$, $C_{21}$, $C_{31}$, $C_{12}$, $C_{32}$, $C_{13}$, $C_{23}$, and $C_{33}$, totaling in nine pixels, on the basis of the control of the control unit 117.

Figure 7:
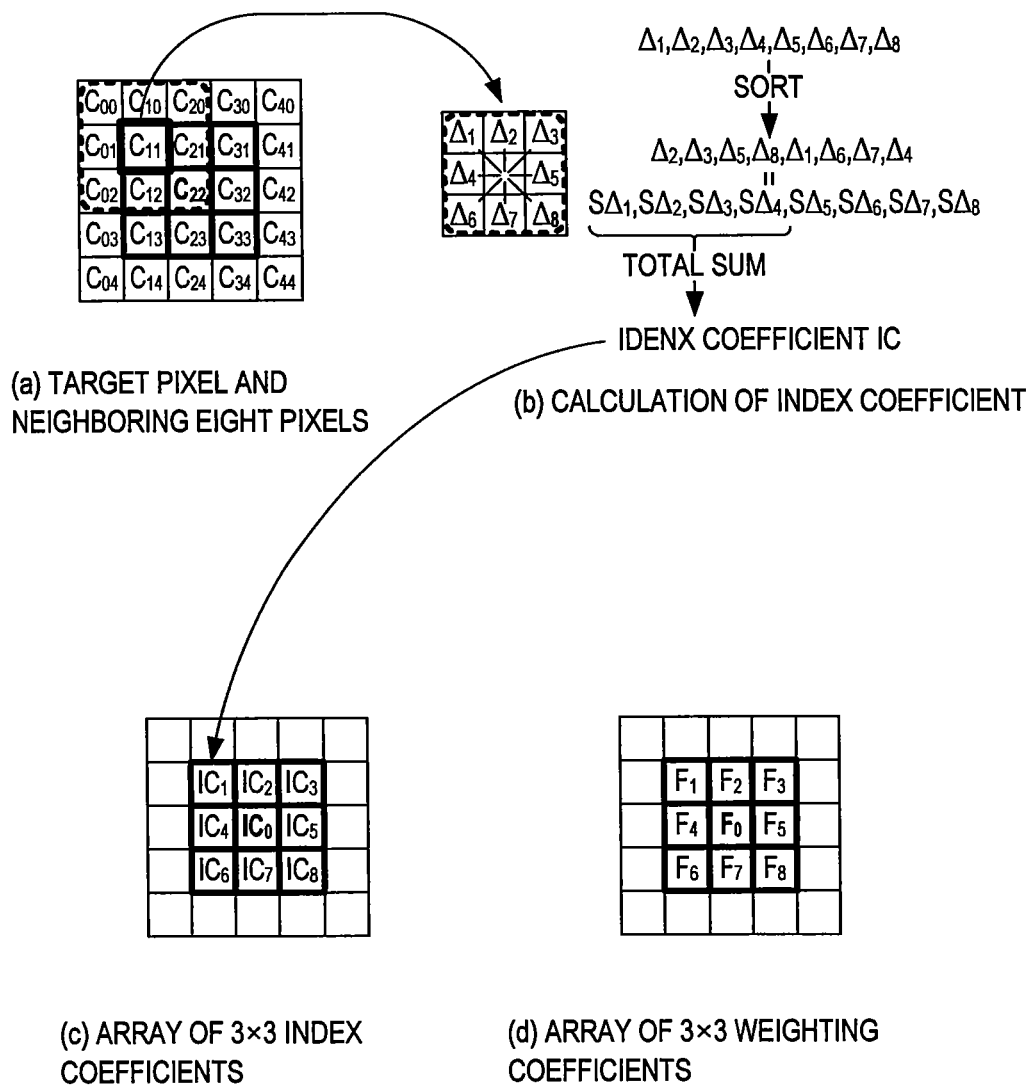
FIG. 7 is an explanatory diagram concerning index coefficient calculation.

FIG. 7(a) shows an array of the target pixel $C_{22}$ and its neighboring eight pixels $C_{11}$, $C_{21}$, $C_{31}$, $C_{12}$, $C_{32}$, $C_{13}$, $C_{23}$, and $C_{33}$ in the local area. The difference calculation unit 301 calculates the absolute values of the differences $\Delta$ from the neighboring eight pixels for each of the nine pixels. FIG. 7(b) shows an array of the pixels for which the absolute values of the differences $\Delta$ are calculated. For example, in the case of the $C_{11}$ pixel, the absolute values of the differences $\Delta$ are shown by equations (8):

$$\Delta_1 = |C_{00} - C_{11}|$$

$$\Delta_2 = |C_{10} - C_{11}|$$

$$\Delta_3 = |C_{20} - C_{11}|$$

$$\Delta_4 = |C_{01} - C_{11}|$$

$$\Delta_5 = |C_{21} - C_{11}|$$

$$\Delta_6 = |C_{02} - C_{11}|$$

$$\Delta_7 = |C_{12} - C_{11}|$$

$$\Delta_8 = |C_{22} - C_{11}| \quad (8)$$

In the following, the calculated eight absolute values of the differences are noted as $\Delta_l$ (l=1 to 8). The absolute values of the differences $\Delta_l$ are transferred to the buffer 302.

The sort unit 303 sorts the absolute values of differences $\Delta_l$ in the buffer 302 in the ascending order on the basis of the control of the control unit 117 and transfers them in the predetermined number from the smallest, four values in the first embodiment, to the total sum calculation unit 304. In the following, the absolute values of differences sorted in the ascending order are noted as $S\Delta_m$ (m=1 to 8).

The total sum calculation unit 304 acquires the total sum of the four absolute values of differences sorted in the ascending order of the transfer from the sort unit 303 on the basis of the control of the control unit 117. The total sum is the index coefficient IC.

$$IC = \sum_{m=1,4} S\Delta_m \quad (9)$$

With regard to the impulsive noise as shown in a defective pixel, since the differences from all the eight neighboring pixels are large, the index coefficient IC has a large value. On the other hand, in a flat portion, since the differences from all the pixels are small, the index coefficient IC has a small value. Also, in a simple linear edge portion, half of the eight neighboring pixels lead to small values, while the remaining half lead to large values. Since the four small differences are selected and summed, the simple edge portion takes a small value. The value becomes large in a complicated edge structure, but the value is smaller than that of the impulsive noise. From the above, the impulsive noise can be separated from the edge and the flat portion by the index coefficient IC.

The weighting coefficient table unit 305 is a lookup table for outputting a weighting coefficient F to be used for weighting filtering processing in latter part on the basis of the index coefficient IC. This is constructed on the basis of an equation (10):

$$F = e^{-\frac{IC^2}{2\sigma^2}} \quad (10)$$

Reference character a in the equation (10) is a parameter for adjustment. The weighting coefficient F is transferred to the buffer 306. The index coefficients IC and the weighting coefficients F are calculated in relation to the nine pixels in total as shown in FIGS. 7(c) and 7(d), that is, the target pixel $C_{22}$ and its neighboring eight pixels $C_{11}$, $C_{21}$, $C_{31}$, $C_{12}$, $C_{32}$, $C_{13}$, $C_{23}$, and $C_{33}$. That is, the difference calculation unit 301, the sort unit 303, the total sum calculation unit 304, and the weighting coefficient table unit 305 repeat the processing nine times on the basis of the control of the control unit 117. In the following, the index coefficient is noted as $IC_k$, and the weighting coefficient is noted as $F_k$. The total sum calculation unit 304 transfers only the index coefficient $IC_0$ of the target pixel $C_{22}$ to the combining unit 114.

The weighting filtering unit 307 reads the target pixel and its neighboring eight pixels in the local area from the buffer 300, reads the weighting coefficient $F_k$ from the buffer 306, and performs weighting filtering processing on the basis of the control of the control unit 117. Here, the target pixel $C_{22}$ is noted as $C_0$, the neighboring eight pixels as $C_1$ to $C_8$, and nine all pixels as $C_k$ in a simplified manner. By the weighting filtering processing shown in an equation (11), the target pixel $C^{N2}_{22}$ which has been subjected to the impulsive noise reduction processing is obtained:

$$C^{N2}_{22} = \frac{\sum_{k=0,8} F_k \cdot C_k}{\sum_{k=0,8} F_k} \quad (11)$$

The target pixel $C^{N2}_{22}$ which has been subjected to the impulsive noise reduction processing is transferred to the combining unit 114.

The second noise reduction unit 113 shown in FIG. 6 is configured such that the absolute values of differences are sorted in the ascending order in the calculation of the index coefficient and the total sum of the predetermined number from the smallest is acquired, and weighting filtering processing is performed as the impulsive noise reduction processing, but it does not have to be limited to such configuration. For example, a configuration in which the total sum is acquired from all the absolute values of differences in the calculation of the index coefficient as shown in FIG. 8 or a configuration in which a non-linear filtering processing such as a median filter is performed as the impulsive noise reduction processing can be employed.

Figure 8:
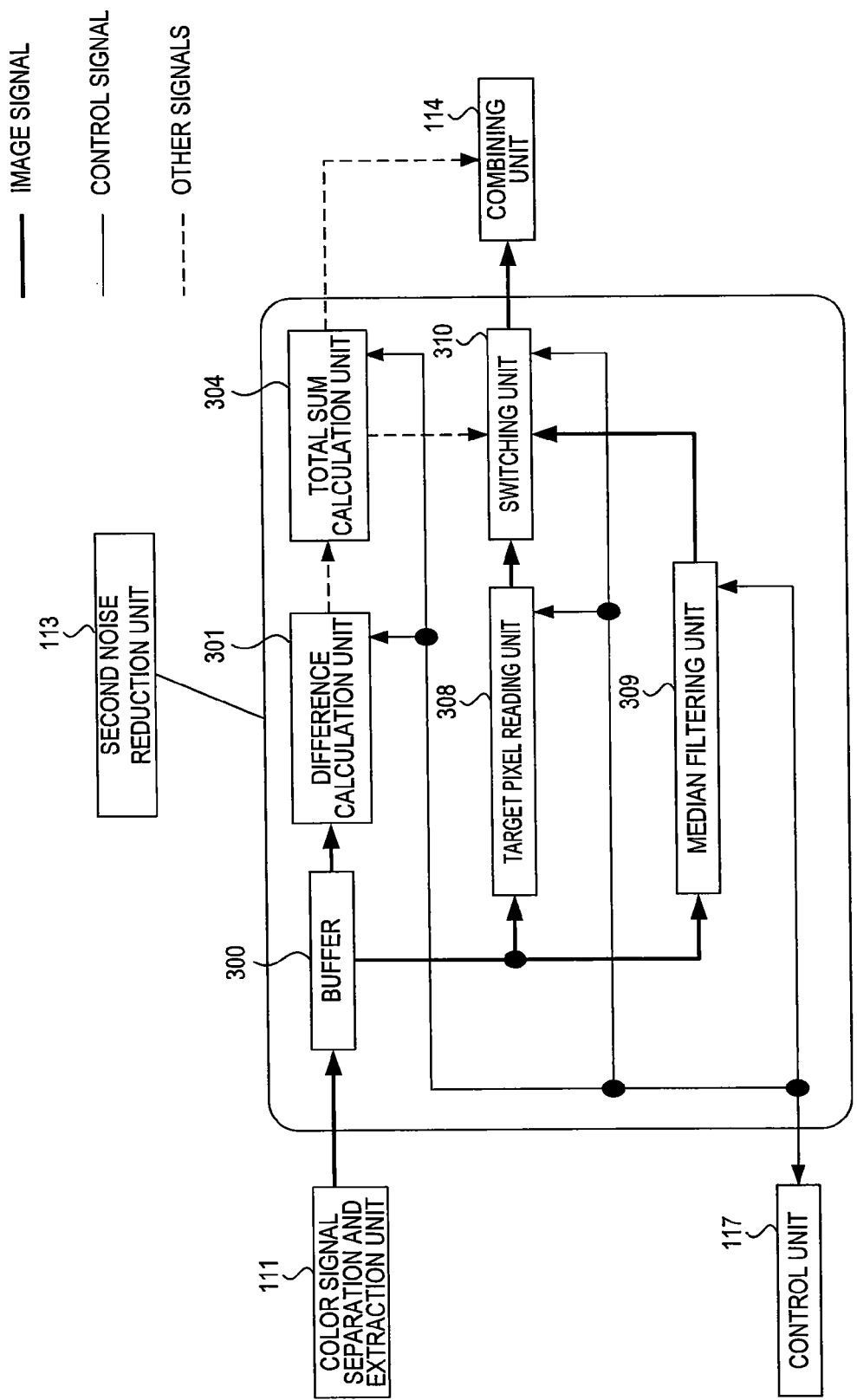
FIG. 8 is a configuration diagram of a second noise reduction unit in another form.

FIG. 8 shows an example of another configuration of the second noise reduction unit 113, in which the buffer 302, the sort unit 303, the weighting coefficient table unit 305, the buffer 306, and the weighting filtering unit 307 are omitted from the second noise reduction unit 113 shown in FIG. 6, and a target pixel reading unit 308, a median filtering unit 309, and a switching unit 310 are added. The basic configuration is the same as the second noise reduction unit 113 shown in FIG. 6, and the same names and reference numerals are allocated to the same configurations. Only the different portions will be described below.

The buffer 300 is connected to the difference calculation unit 301, the target pixel reading unit 308, and the median filtering unit 309. The difference calculation unit 301 is connected to the total sum calculation unit 304. The total sum calculation unit 304 is connected to the switching unit 310 and the combining unit 114. The target pixel reading unit 308 and the median filtering unit 309 are connected to the switching unit 310. The switching unit 310 is connected to the combining unit 114. The control unit 117 is bidirectionally connected to the target pixel reading unit 308, the median filtering unit 309, and the switching unit 310.

The difference calculation unit 301 calculates the absolute values of differences $\Delta_1$ from the neighboring eight pixels in relation to the target pixel $C_{22}$ on the basis of the control of the control unit 117. The calculated absolute values of the differences $\Delta_1$ are transferred to the total sum calculation unit 304.

The total sum calculation unit 304 acquires the total sum of the absolute values of differences $\Delta_1$ on the basis of the control of the control unit 117. The total sum is the index coefficient $IC_0$ in relation to the target pixel $C_{22}$.

$$IC_0 = \sum_{I=1,8} \Delta_I \quad (12)$$

The index coefficient $IC_0$ is transferred to the switching unit 310 and the combining unit 114.

The target pixel reading unit 308 reads the target pixel $C_{22}$ from the buffer 300 and transfers it to the switching unit 310 on the basis of the control of the control unit 117.

The median filtering unit 309 reads the local area from the buffer 300, performs the known median filtering processing and obtains a processing result $MC_{22}$ concerning the target pixel $C_{22}$ on the basis of the control of the control unit 117. The median filtering processing result $MC_{22}$ is transferred to the switching unit 310.

The switching unit 310 performs switching control concerning the target pixel $C_{22}$ from the target pixel reading unit 308 and the median filtering processing result $MC_{22}$ from the median filtering unit 309 using the index coefficient $IC_0$ from the total sum calculation unit 304 on the basis of the control of the control unit 117 so as to obtain the target pixel $C^{N2}_{22}$ subjected to the impulsive noise reduction processing.

$$C^{N2}_{22} = C_{22} (IC_0 \leq Th3)$$

$$C^{N2}_{22} = MC_{22} (IC_0 > Th3) \quad (13)$$

Here, reference character Th3 denotes a predetermined threshold value. With regard to the index coefficient $IC_0$ on the basis of the equation (12), in the impulsive noise such as a defective pixel, since the differences from all the neighboring eight pixels are large, the index coefficient IC becomes a large value. On the other hand, since the differences from all the pixels in the flat portion are small, the index coefficient IC becomes a small value. Therefore, if the index coefficient IC is more than the predetermined threshold value Th3, by selecting the median filtering processing result $MC_{22}$ as shown in an equation (13), the impulsive noise reduction processing is performed.

Figure 9:
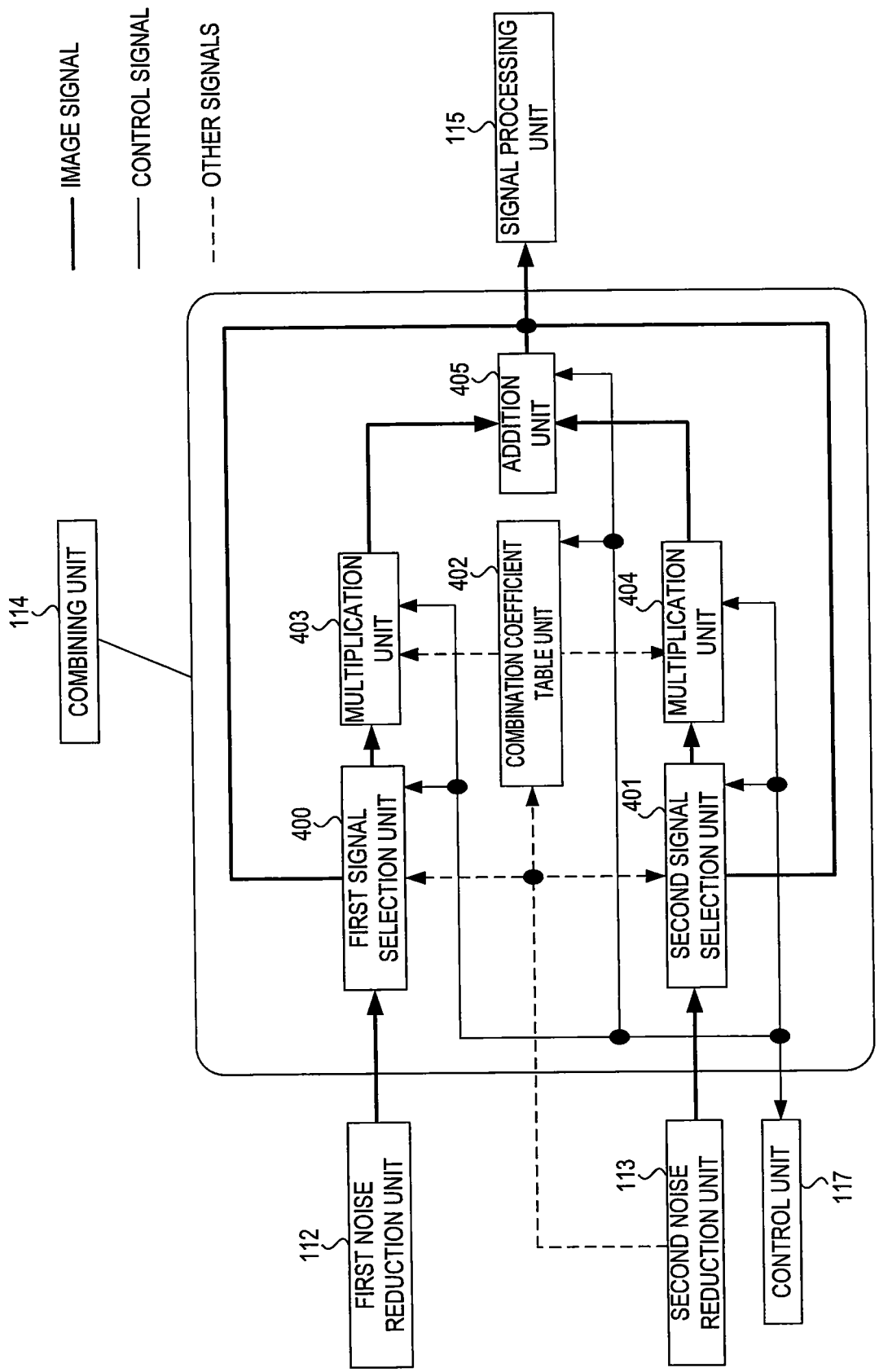
FIG. 9 is a configuration diagram of a combining unit.

FIG. 9 shows an example of a configuration of the combining unit 114, which is configured by the first signal selection unit 400, a second signal selection unit 401, a combination coefficient table unit 402, a multiplication unit 403, a multiplication unit 404, and an addition unit 405.

The first noise reduction unit 112 is connected to the first signal selection unit 400. The second noise reduction unit 113 is connected to the first signal selection unit 400, the second signal selection unit 401, and the combination coefficient table unit 402. The first signal selection unit 400 is connected to the multiplication unit 403 and the signal processing unit 115. The second signal selection unit 401 is connected to the multiplication unit 404 and the signal processing unit 115. The combination coefficient table unit 402 is connected to the multiplication unit 403 and the multiplication unit 404. The multiplication unit 403 and the multiplication unit 404 are connected to the addition unit 405, and the addition unit 405 is connected to the signal processing unit 115. The control unit 117 is bidirectionally connected to the first signal selection unit 400, the second signal selection unit 401, the combination coefficient table unit 402, multiplication unit 403, the multiplication unit 404, and the addition unit 405.

The first signal selection unit 400 reads the index coefficient $IC_0$ relating to the target pixel $C_{22}$ from the second noise reduction unit 113 and the target pixel $C^{N1}_{22}$ subjected to the random noise reduction processing from the first noise reduction unit 112 on the basis of the control of the control unit 117. If the index coefficient $IC_0$ is not more than the predetermined threshold value Th1, the target pixel $C^{N1}_{22}$ is transferred to the signal processing unit 115 as the target pixel $C^{N}_{22}$ after combination. If the index coefficient $IC_0$ is more than the predetermined threshold value Th1, the target pixel $C^{N1}_{22}$ is transferred to the multiplication unit 403.

The second signal selection unit 401 reads the index coefficient $IC_0$ relating to the target pixel $C_{22}$ and the target pixel $C^{N2}_{22}$ subjected to the impulsive noise reduction processing from the second noise reduction unit 113 on the basis of the control of the control unit 117. If the index coefficient $IC_0$ is not smaller than the predetermined threshold value Th2, the target pixel $C^{N2}_{22}$ is transferred to the signal processing unit 115 as the target pixel $C^{N}_{22}$ after combination. If the index coefficient $IC_0$ is smaller than the predetermined threshold value Th2, the target pixel $C^{N2}_{22}$ is transferred to the multiplication unit 404.

Figure 10:
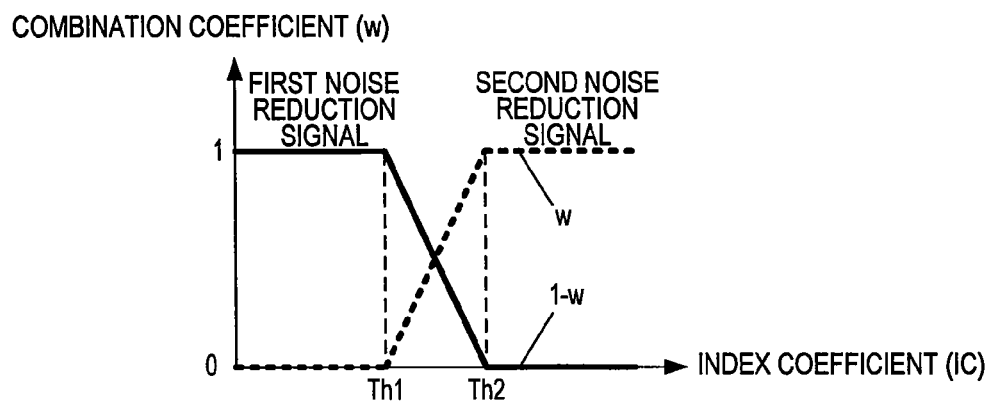
FIG. 10 is an explanatory diagram concerning a combination coefficient.

The combination coefficient table unit 402 is a lookup table recording combination coefficients w=0 to 1 and 1−w used for the combination processing for the index coefficient $IC_0$. FIG. 10 is an explanatory diagram relating to the combination coefficient w, which has a characteristic that in the case of the index coefficient $IC_0 \leq Th1$, it is w=0, in the case of the index coefficient $IC_0 \geq Th2$, it is w=1, and in the case of $Th1 < IC_0 < Th2$, it changes linearly as w=0 to 1. The combination coefficient table unit 402 transfers the combination coefficient 1−w to the multiplication unit 403 and the combination coefficient w to the multiplication unit 404.

The multiplication unit 403 multiplies the target pixel $C^{N1}_{22}$ by the combination coefficient 1−w on the basis of the control of the control unit 117 if the target pixel $C^{N1}_{22}$ is transferred from the first signal selection unit 400, and transfers the result $(1-w) \cdot C^{N1}_{22}$ to the addition unit 405.

The multiplication unit 404 multiplies the target pixel $C^{N2}_{22}$ by the combination coefficient w on the basis of the control of the control unit 117 if the target pixel $C^{N2}_{22}$ is transferred from the second signal selection unit 401, and transfers the result $w \cdot C^{N2}_{22}$ to the addition unit 405.

The addition unit 405 performs adding processing of the $(1-w) \cdot C^{N1}_{22}$ from the multiplication unit 403 and the $w \cdot C^{N2}_{22}$ from the multiplication unit 404 on the basis of the control of the control unit 117 and acquires the target pixel $C^{N}_{22}$ after combination. As above, the combination processing shown in the equation (1) is performed.

[Action]

With the above configuration, the reduction processing can be performed independently for the random noise and the impulsive noise with different natures and the combination processing can be applied to the both on the basis of the index coefficient indicating the degree of impulsiveness. Thus, the optimal noise reduction processing can be performed for the both random and impulsive noises, and a high-quality image signal can be obtained.

Also, occurrence of discontinuity or artifact caused by two types of the noise reduction processing can be suppressed. Since the random noise reduction processing is performed by estimating the noise amount by the unit of a target pixel, only the noise component can be reduced with high accuracy, and a high-quality image signal can be obtained.

The configuration using an average value for the estimation of the noise amount can be easily implemented and cost reduction and high-speed processing can be realized. On the other hand, the configuration using the low-pass filter for the estimation of the noise amount, since weighting on the target pixel and the other pixels can be controlled, stable processing can be realized. The estimation of the noise amount dynamically adapts to conditions which are different for each shooting, and highly accurate and stable estimation of the noise amount becomes possible. Also, the configuration using the interpolation calculation for calculation of the noise amount can be easily implemented and cost reduction of the system can be realized. On the other hand, the configuration to acquire the noise amount from the lookup table realizes high-speed processing.

Also, since the coring processing is used for the random noise reduction processing, only the noise component can be reduced with an emphasis and continuity with the pixels other than the noise such as edges can be ensured.

In the impulsive noise reduction processing, with the configuration in which the degree of impulsiveness is acquired for each pixel of the local area and weighting filtering processing is performed, only the noise component can be reduced with high accuracy. Also, with the configuration to acquire the weighting coefficient from the lookup table, high-speed processing can be realized. On the other hand, with the configuration in which the degree of impulsiveness is acquired only for the target pixel and nonlinear filtering processing is performed, high-speed processing can be realized.

Also, since the median filter is used as the non-linear filtering processing, cost reduction of the entire system can be realized.

In the index coefficient indicating the degree of the impulsiveness, with the configuration using the total sum of the differences from the neighboring pixels, high-speed processing and a low-cost system can be provided. On the other hand, with the configuration in which the differences with the neighboring pixels are sorted and the total sum of the predetermined number from the smallest value is used, the impulsive noise and the edge portion can be distinguished with high accuracy and a high-quality image signal with less deterioration of the edge portion can be obtained.

Also, since the noise reduction processing is performed for each color signal, the noise can be reduced with high accuracy and a high-quality image signal can be obtained. Also, since no preprocessing such as interpolation processing is present prior to the noise reduction processing, the accuracy of the noise reduction processing can be improved.

Moreover, the Bayer type primary color filter has high compatibility with the current image pickup system and enables combinations with a wide variety of the systems.

[Variation]

In the first embodiment, the Bayer type primary color filter is used as the image pickup element, but not limited to this type of configuration. For example, a color difference line sequential complementary filter as shown in FIG. 2C can be used, and two CCD, three CCD can also be used.

Figures 2C, 2D:
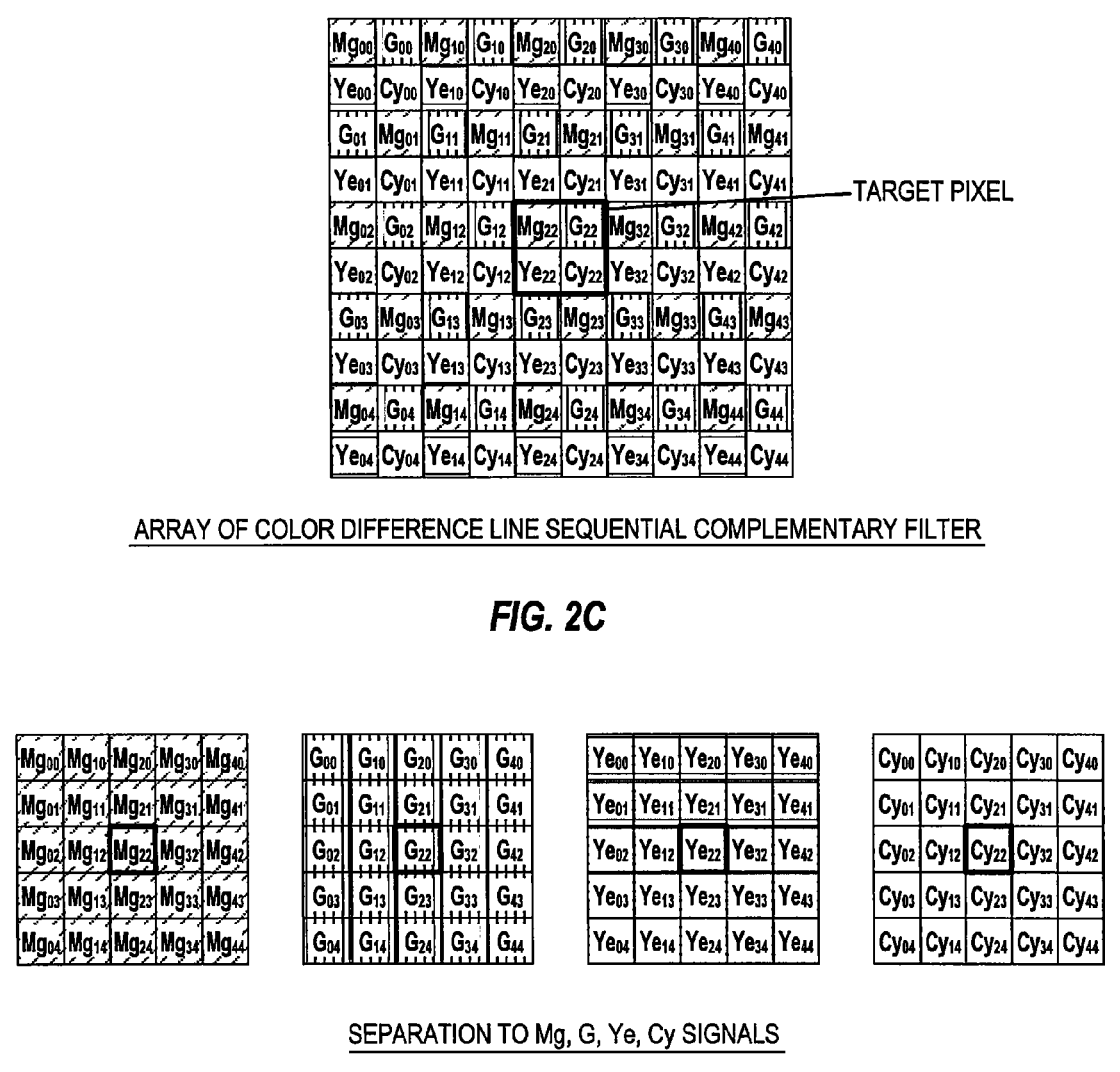

FIG. 2C shows a configuration of a color difference line sequential complementary filter. The color difference line sequential method uses 2×2 pixels as a basic unit, in which one pixel each of cyan (Cy), magenta (Mg), yellow (Ye), and green (G) is arranged. However, positions of Mg and G are reversed by line. In the case of the color difference line sequential complementary filter, the color signal separation and extraction unit 111 reads an image signal by the unit of 10×10 pixels shown in FIG. 2C and separates them into a local area of 5×5 pixels around a target pixel for each of the color filters of Mg, G, Ye, and Cy as shown in FIG. 2D. A pixel value in the local area is shown by $C_{ij}$ (C is a color signal and C=Mg, G, Ye, Cy).

Moreover, in the first embodiment, the configuration is integrated with the image pickup unit including the lens system 100, the aperture 101, the CCD 102, the temperature sensor 103, the Gain 104, the A/D 105, the PreWB unit 107, the exposure control unit 108, the focus control unit 109, and the AF motor 110, but not limited to this type of configuration. For example, as shown in FIG. 11, it can be so configured that an image signal picked up by another image pickup unit is processed in an unprocessed raw data form with incidental information such as a color filter of the CCD 102, an exposure condition at shooting and the like in a header portion recorded in a recording medium.

Figure 11:
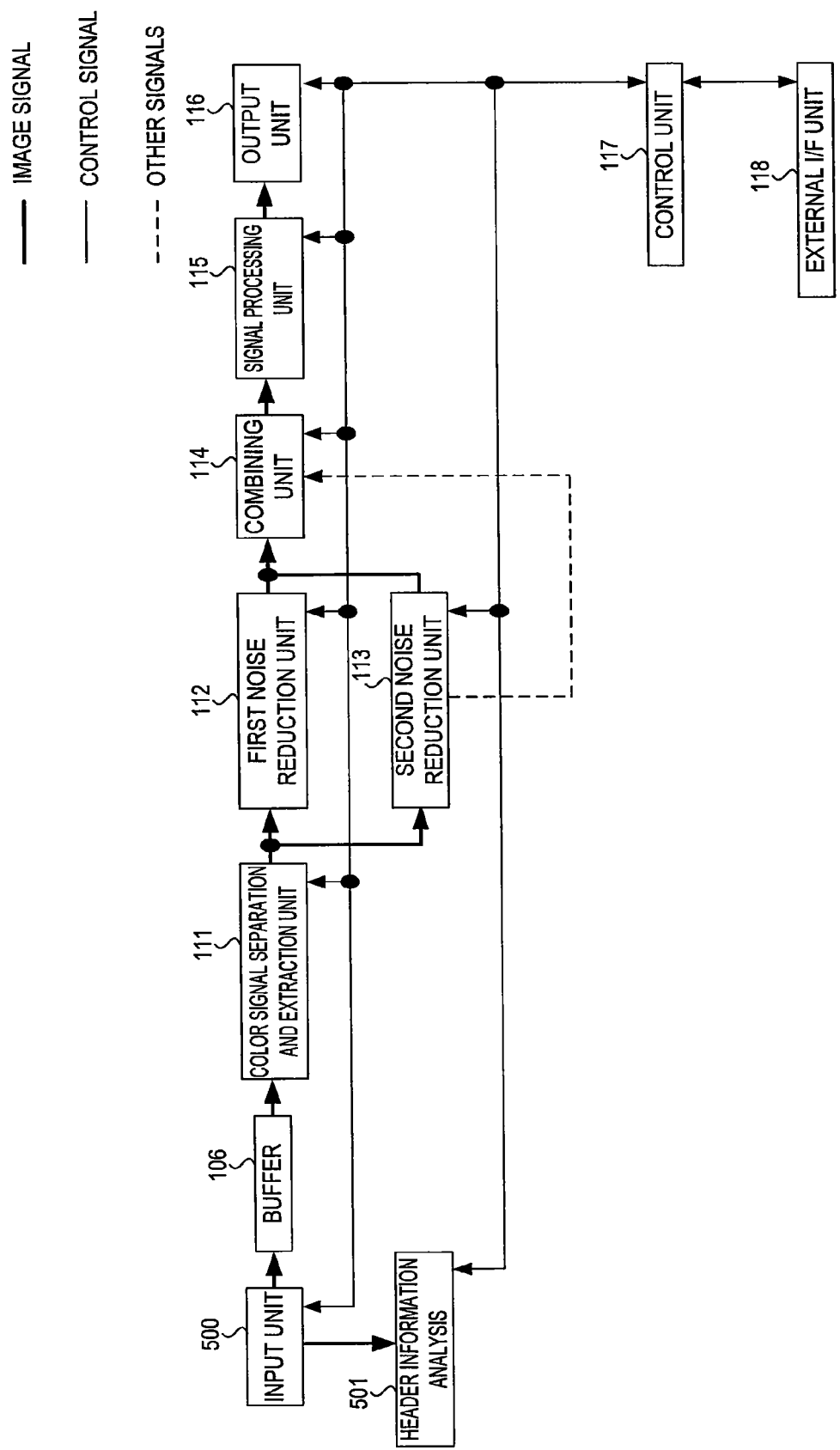
FIG. 11 is a configuration diagram of a first embodiment in another form.

FIG. 11 shows a form in which the lens system 100, the aperture 101, the CCD 102, the temperature sensor 103, the Gain 104, the A/D 105, the PreWB unit 107, the exposure control unit 108, the focus control unit 109, and the AF motor 110 are omitted from the configuration shown in FIG. 1 and an input unit 500 and a header information analysis unit 501 are added. The basic configuration is equal to that of FIG. 1, and the same names and reference numerals are allocated to the same configurations. Only different portions will be described below.

The input unit 500 is connected to the buffer 106 and the header information analysis unit 501. The control unit 117 is bidirectionally connected to the input unit 500 and the header information analysis unit 501.

By starting a replay operation through an external I/F unit 118 such as a mouse, a keyboard and the like, an image signal and header information stored in a recording medium are read out of the input unit 500. The image signal from the input unit 500 is transferred to the buffer 106 and the header information is transferred to the header information analysis unit 501.

The header information analysis unit 501 extracts information at shooting from the header information and transfers it to the control unit 117. The subsequent processing is equal to that in FIG. 1.

Figure 12A:
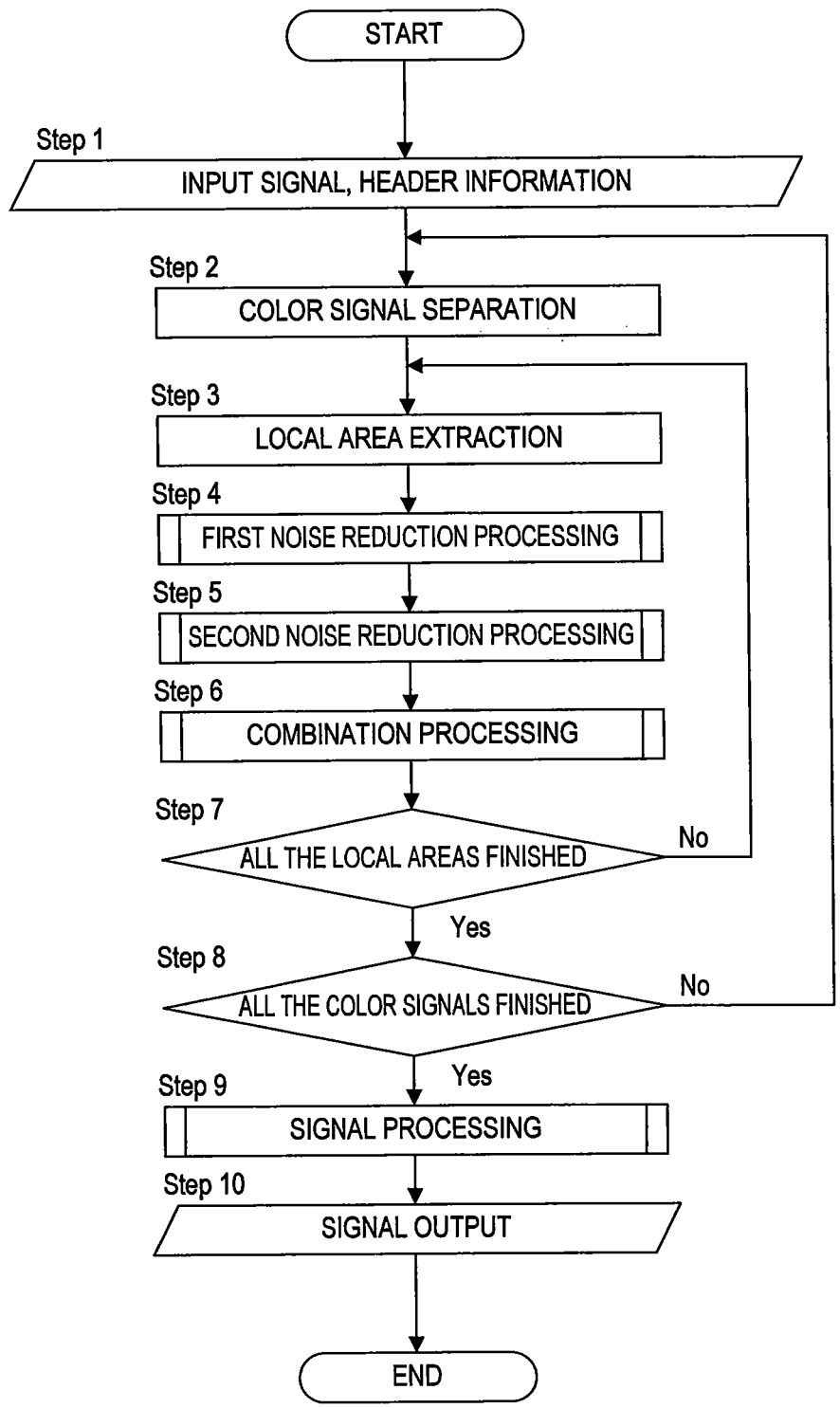
FIG. 12A is a flowchart concerning entire processing in a flow of signal processing in the first embodiment.

Also, in the first embodiment, processing by hardware is assumed, but not limited to this type of configuration. For example, there can be configuration such that the image signal from the CCD 102 outputted as an unprocessed raw data is processed by software with incidental information such as the color filter of the CCD 102 and the exposure condition at shooting as header information. FIG. 12A shows a flow relating to the software processing of the signal processing.

The software may be stored in a computer readable storage medium such as a magnetic disk, a magneto-optical disk, a CD-ROM, a DVD-ROM, and a semiconductor memory. Further, the software may be distributed to a computer over a communication line.

At Step S1, an image signal and header information such as an exposure information at shooting are read.

At Step S2, on the basis of the color filter of the CCD 102 as shown in FIG. 2B, separation is made for each color signal.

At Step S3, a local area with a predetermined size, that is, 5×5 pixel size, for example, including a target pixel to be a target of the noise reduction processing is extracted as shown in FIG. 2B.

At Step S4, first noise reduction processing as the random noise reduction processing, which will be described separately, is performed.

At Step S5, second noise reduction processing as the impulsive noise reduction processing, which will be described separately, is performed.

At Step S6, a signal subjected to the first noise reduction processing and a signal subjected to the second noise reduction processing are combined as will be described separately.

At Step S7, it is determined if all the local areas have been completed, and if not, the routine branches to Step S3, while if completed, the routine branches to Step S8.

At Step S8, it is determined if all the color signals have been completed, and if not, the routine branches to Step S2, while if completed, the routine branches to Step S9.

At Step S9, signal processing such as known interpolation processing, gradation conversion processing, edge enhancing processing, color enhancing processing and the like is performed.

At Step S10, the image signal for which processing has been completed is outputted and finished.

Figure 12B:
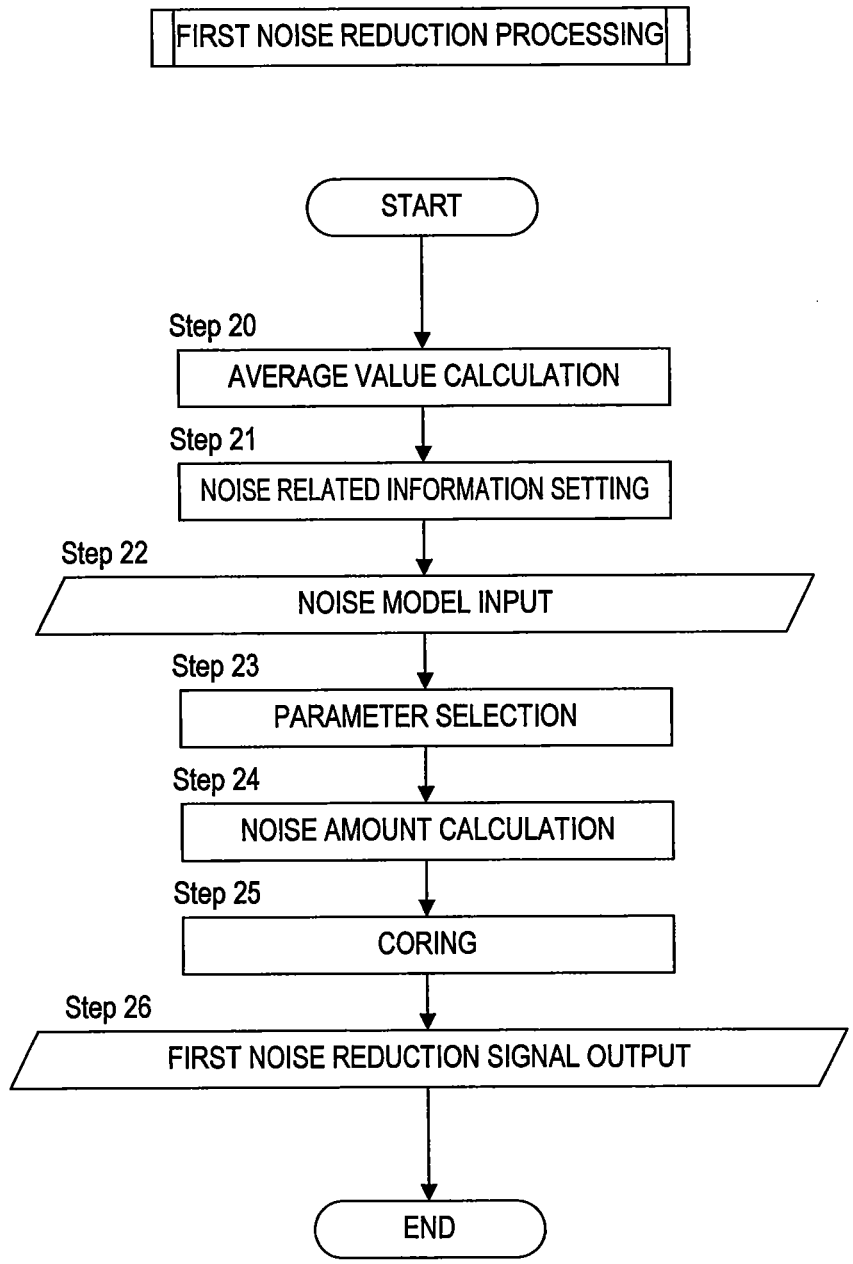
FIG. 12B is a flowchart concerning first noise reduction processing in the flow of signal processing in the first embodiment.

FIG. 12B is a flow relating to the first noise reduction processing at Step S4.

At Step S20, an average value of the local area is calculated as shown in the equation (2).

At Step S21, information such as temperature, gain and the like is set from the read header information. If there is no required parameter in the header information, a predetermined standard value is allocated.

At Step S22, coordinate data and a correction coefficient of a reference noise model are read.

At Step S23, the coordinate data and a corresponding correction coefficient for a section of the reference noise model to which the target pixel belongs are selected.

At Step S24, a noise amount is acquired by the interpolation processing shown in the equations (5) and (6).

At Step S25, a signal subjected to the random noise reduction processing is acquired by the coring processing shown in the equation (7).

At Step S26, a signal subjected to the first noise reduction processing is outputted and finished.

Figure 12C:
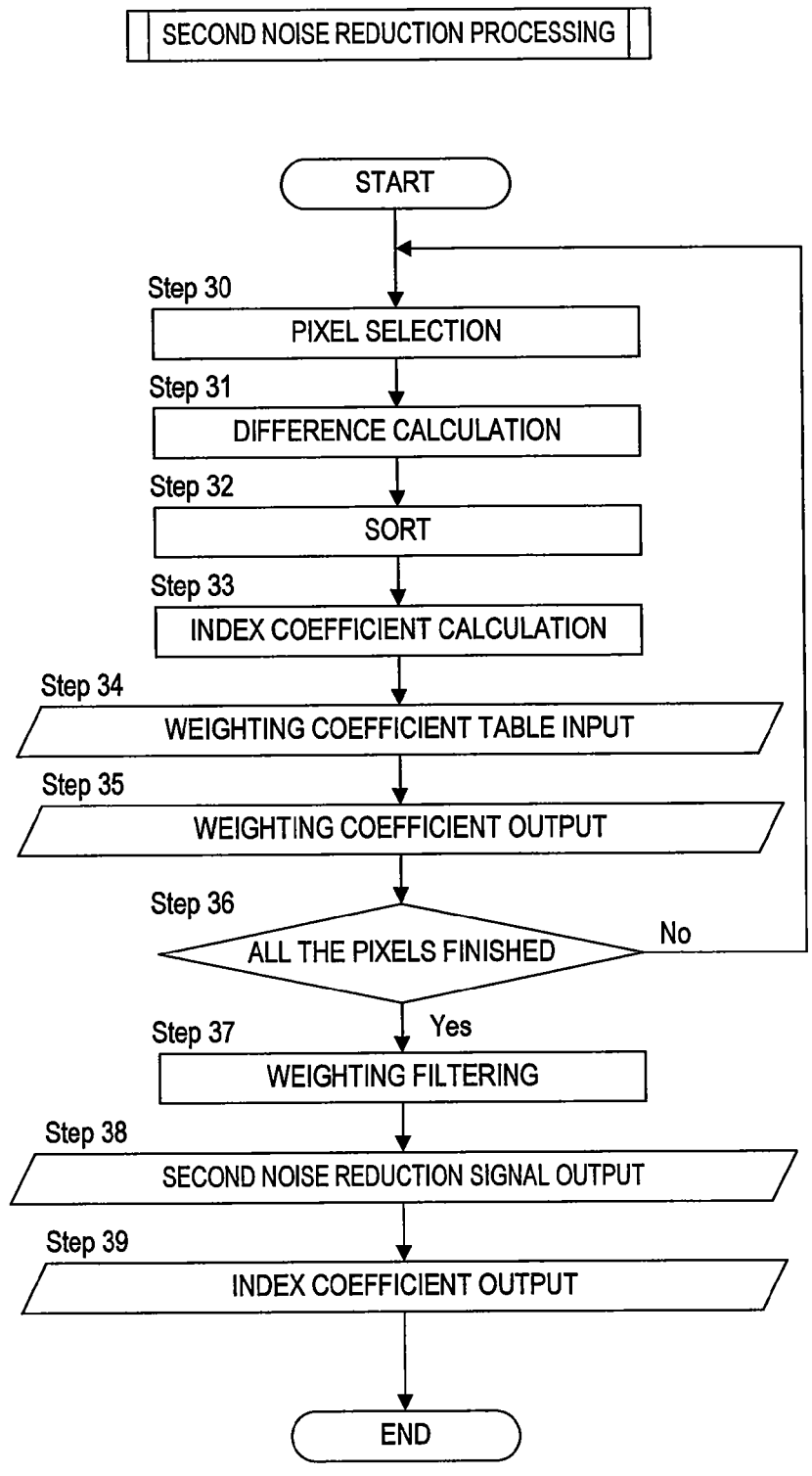
FIG. 12C is a flowchart concerning second noise reduction processing in the flow of signal processing in the first embodiment.

FIG. 12C is a flow relating to the second noise reduction processing at Step S5.

At Step S30, a target pixel in the local area and one of the neighboring eight elements are selected.

At Step S31, absolute values of eight differences are calculated as shown in the equation (8).

At Step S32, the absolute values of the eight differences are sorted in the ascending order.

At Step S33, the total sum of the absolute values of differences in a predetermined number from the smallest, four differences, for example, is acquired as shown in the equation (9) and made an index coefficient.

At Step S34, a lookup table with the index coefficient as an input and a weighting coefficient as an output, constructed on the basis of the equation (10) is inputted.

At Step S35, the weighting coefficient is outputted on the basis of the index coefficient.

At Step S36, it is determined if the target pixel and all the neighboring eight pixels have been selected or not, and if the selection has not been completed, the routine branches to Step S30, while if completed, the routine branches to Step S37.

At Step S37, weighting filtering processing shown in the equation (11) is performed.

At Step S38, a signal obtained by the weighting filtering processing is outputted as a signal subjected to the second noise reduction processing.

At Step S39, the index coefficient relating to the target pixel is outputted and finished.

Figure 12D:
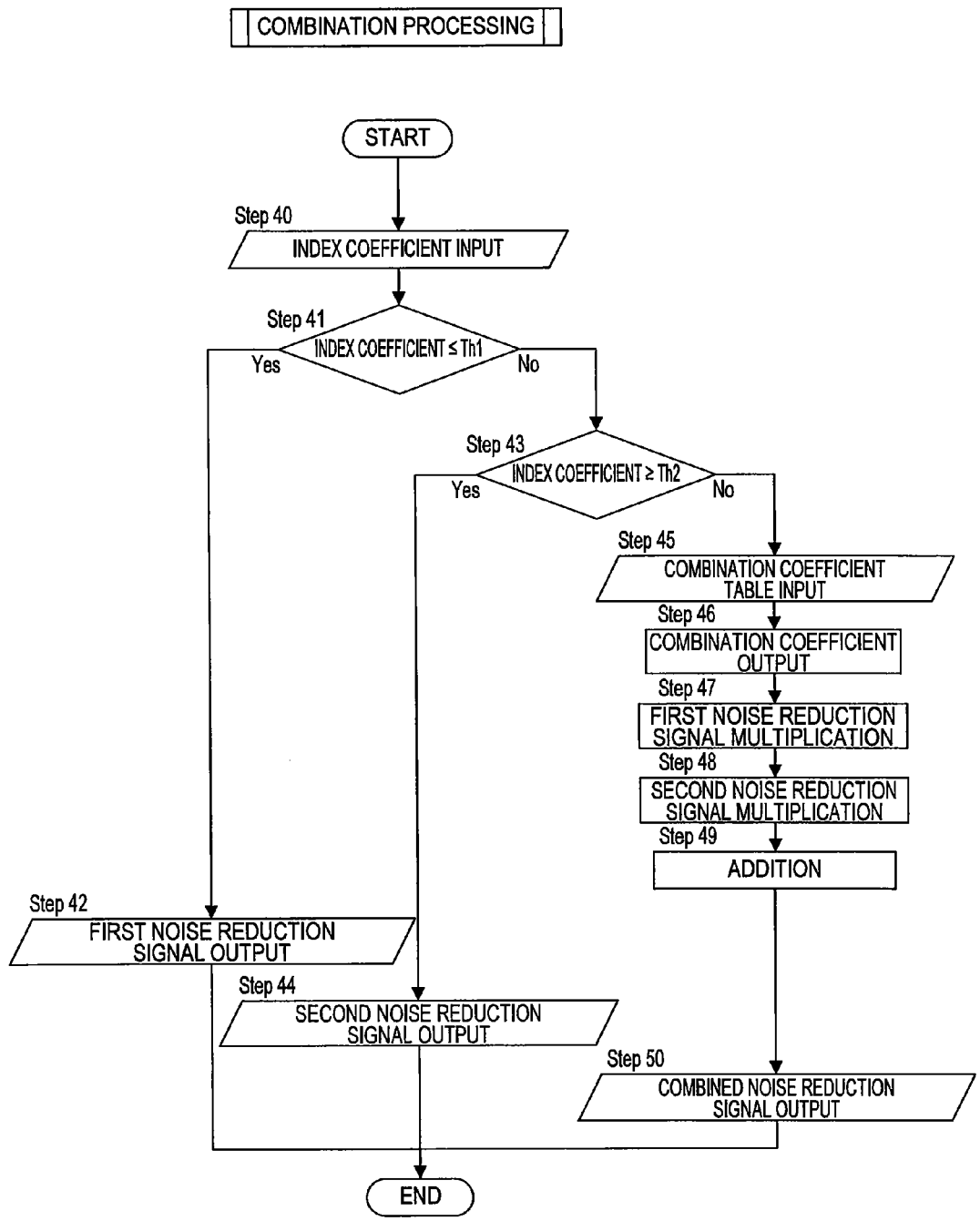
FIG. 12D is a flowchart concerning combination processing in the flow of signal processing in the first embodiment.

FIG. 12D is a flow relating to the combination processing at Step S6.

At Step S40, the index coefficient relating to the target pixel is inputted.

At Step S41, the index coefficient is compared with a predetermined threshold value Th1, and if the index coefficient is not more than the threshold value Th1, the routine branches to Step S42, while if the index coefficient is more than the threshold value Th1, the routine branches to Step S43.

At Step S42, a signal subjected to the first noise reduction processing is outputted and finished.

At Step S43, the index coefficient is compared with a predetermined threshold value Th2, and if the index coefficient is not smaller than the threshold value Th2, the routine branches to Step S44, while if the index coefficient is smaller than the threshold value Th2, the routine branches to Step S45.

At Step S44, a signal subjected to the second noise reduction processing is outputted and finished.

At Step S45, a lookup table with the index coefficient as an input and a combination coefficient as an output shown in FIG. 10 is inputted.

At Step S46, the combination coefficient is outputted on the basis of the index coefficient.

At Step S47, the signal subjected to the first noise reduction processing is multiplied by (1-combination coefficient).

At Step S48, the signal subjected to the second noise reduction processing is multiplied by the combination coefficient.

At Step S49, a signal obtained by multiplying the signal subjected to the first noise reduction processing by (1-combination coefficient) and a signal obtained by multiplying the signal subjected to the second noise reduction processing by the combination coefficient are added together.

At Step S50, the combined signal is outputted and the routine is finished.

As mentioned above, the signal processing may be configured to be executed by software, and the same working effects as the processing by hardware can be exerted.

Second Embodiment

[Configuration]

Figure 13:
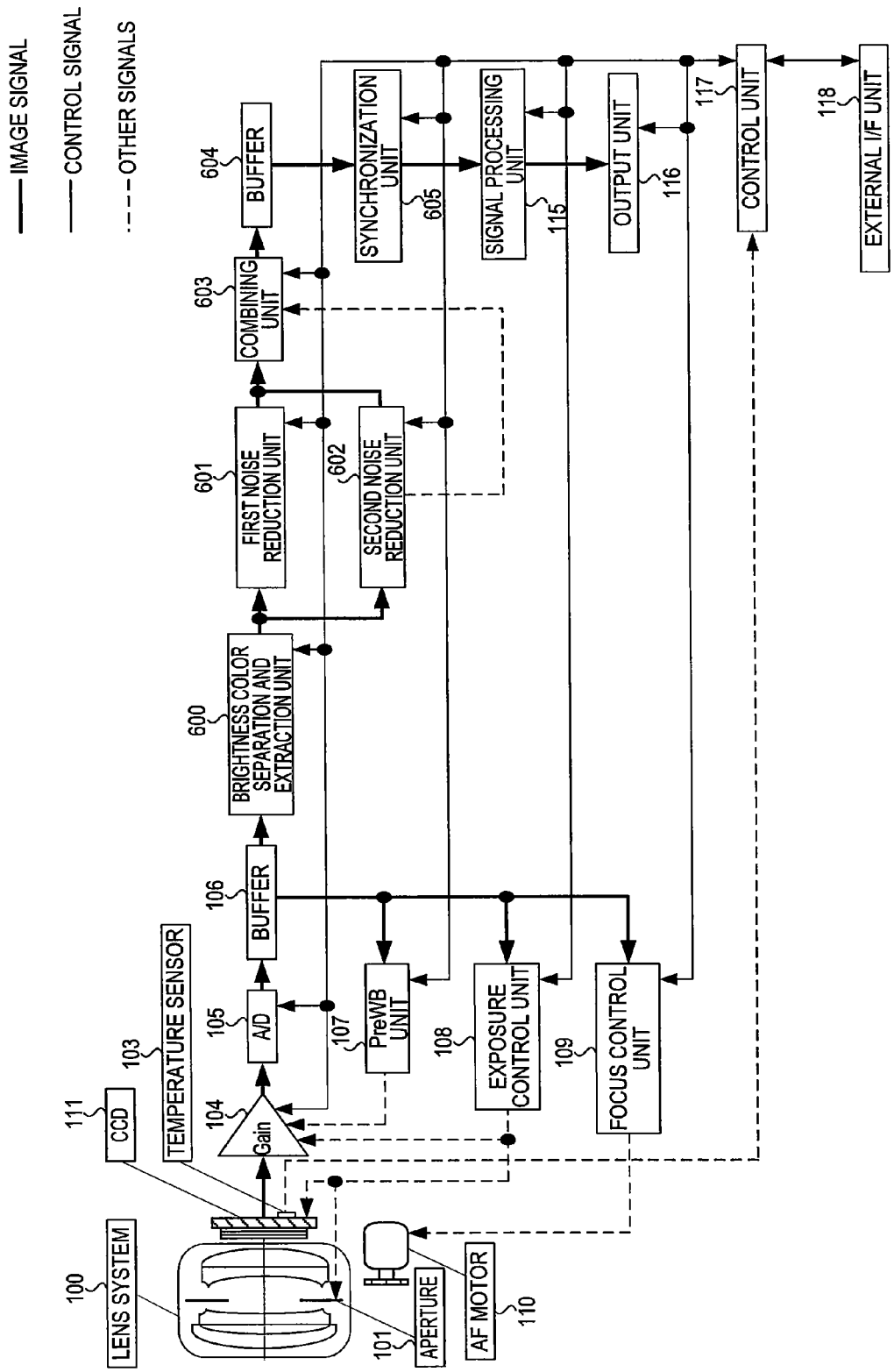
FIG. 13 is a configuration diagram of a second embodiment.

FIG. 13 is a configuration diagram of a second embodiment. In the second embodiment, the color signal separation and extraction unit 111 in the first embodiment shown in FIG. 1 is replaced by a brightness color separation and extraction unit 600, the first noise reduction unit 112 by a first noise reduction unit 601, the second noise reduction unit 113 by a second noise reduction unit 602, and the combining unit 114 by a combining unit 603, and a buffer 604 and a synchronization unit 605 are added. The basic configuration is the equal to that of the first noise reduction embodiment, and the same names and reference numerals are allocated to the same configurations. Only the different portions will be described below.

The buffer 106 is connected to the PreWB unit 107, the exposure control unit 108, the focus control unit 109, and the brightness color separation and extraction unit 600. The brightness color separation and extraction unit 600 is connected to the first noise reduction unit 601 and the second noise reduction unit 602. The first noise reduction unit 601 and the second noise reduction unit 602 are connected to the combining unit 603. The combining unit 603 is connected to the signal processing unit 115 through the buffer 604 and the synchronization unit 605. The control unit 117 is bidirectionally connected to the brightness color separation and extraction unit 600, the first noise reduction unit 601, the second noise reduction unit 602, the combining unit 603, and the synchronization unit 605.

[Action]

The action is basically equal to that of the first embodiment and only different portions will be described. In FIG. 13, a flow of signals will be described. By pressing the shutter button through the external I/F unit 118, an image shooting mode is started. An image signal photographed through the lens system 100, the aperture 101, and the CCD 102 is continuously outputted as an analog signal with a predetermined time interval. In the second embodiment, a single CCD in which a color difference line sequential complementary color filter is arranged on the front face is assumed as the CCD 102.

Figure 14A:
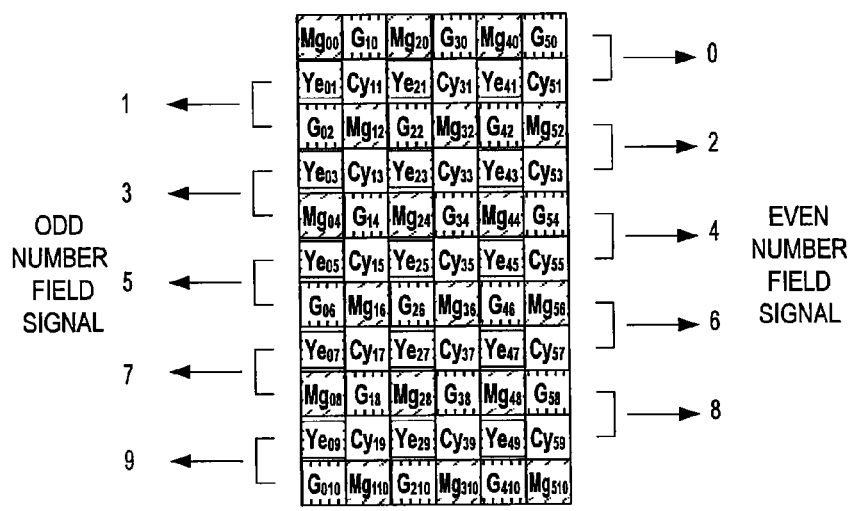
FIGS. 14A to 14C are explanatory diagrams concerning arrangement of color difference line sequential complementary filter and a local area.

FIG. 14A shows a configuration of the color difference line sequential complementary filter. The color difference line sequential method uses 2×2 pixels as a basic unit, in which one pixel each of cyan (Cy), magenta (Mg), yellow (Ye), and green (G) is arranged. However, positions of Mg and G are reversed by line. The image signal from the CCD 102 is, as shown in FIG. 14A, configured by two field signals (even number field signal and odd number field signal) added with upper and lower lines and separated to an even line and an odd line. Also, the predetermined time interval is assumed to be ⅟60 seconds. By combining the even number and odd number field signals, a single image signal is obtained, which is noted as a frame signal. The frame signal is combined at a ⅟30 second interval.

An analog signal from the CCD 102 is amplified at the gain 104 by a predetermined amount and converted to a digital signal at the A/D 105 and transferred to the buffer 106.

The buffer 106 is capable of recording two field signals, that is, one frame signal and sequentially overwritten with progress of shooting. A field signal in the buffer 106 is transferred to the PreWB unit 107, the exposure control unit 108, and the focus control unit 109 intermittently with a predetermined time interval on the basis of the control of the control unit 117.

On the other hand, the brightness color separation and extraction unit 600 calculates a brightness signal Y and a color difference signal Cb, Cr from the even number and odd number field signals on the basis of the control of the control unit 117.

$$Y = G + Mg + Ye + Cy$$

$$Cb = (Mg + Cy) - (G + Ye)$$

$$Cr = (Mg + Ye) - (G + Cy) \tag{14}$$

After that, a local area consisting of a target pixel to be a target of the noise reduction processing and neighboring pixels located in the vicinity of the target pixel is sequentially extracted. In the second embodiment, 5×5 pixels are assumed as the local area. However, the brightness signal Y is present in all the 5×5 pixels but the color difference signals Cb and Cr are 5×3 pixels or 5×2 pixels.

Figure 14B:
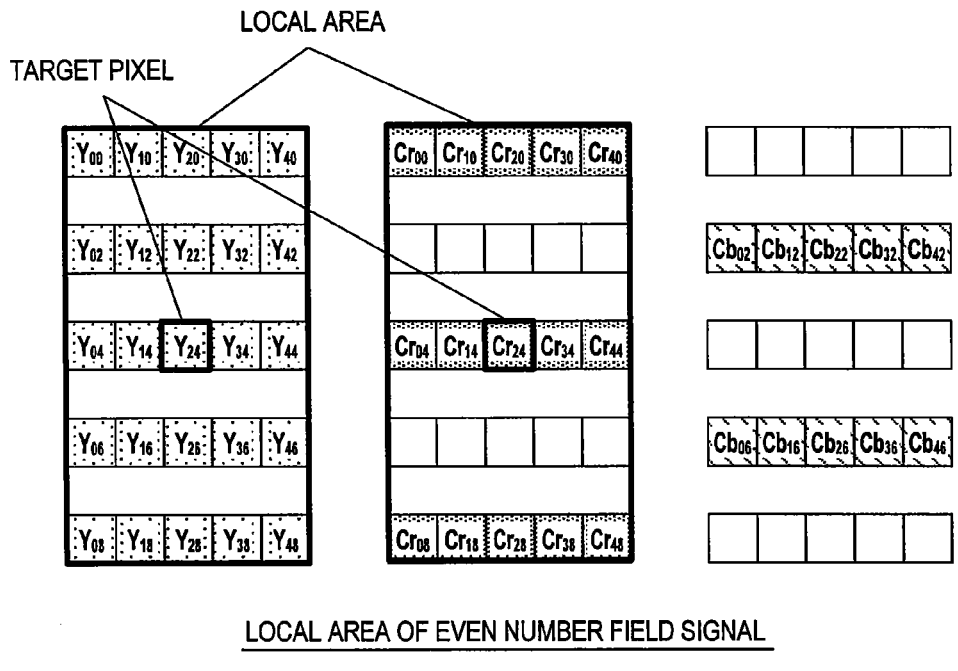
Figure 14C:
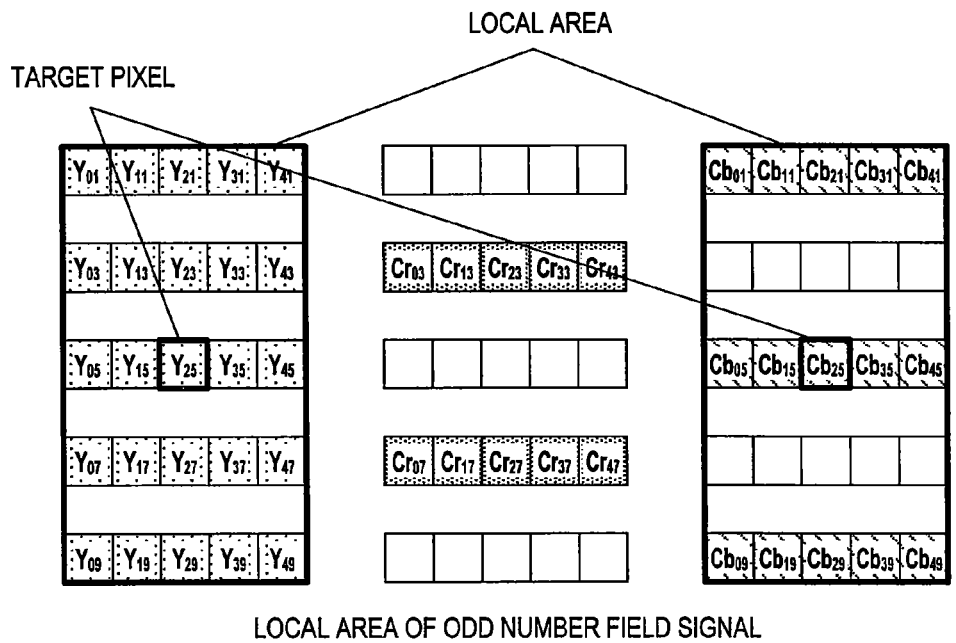

FIGS. 14B and 14C show examples of local areas extracted from the even number and odd number field signals. FIG. 14B shows an example of extraction of the brightness signal Y and the color difference signals Cb and Cr from the even number field signal. The color difference signal Cr has 5×3 pixels and the color difference signal Cb has 5×2 pixels. In this case, the target pixel to be a target of the noise reduction processing is the brightness signal Y and the color difference signal Cr, while the color difference signal Cb is not a target. If the target pixel location is different, there might be a case in which the color difference signal Cb is present, while the color difference signal Cr is not present contrary to the above. FIG. 14C shows an example of extraction of the brightness signal Y and the color difference signals Cb and Cr from the odd number field signal. The color difference signal Cb has 5×3 pixels and the color difference signal Cr has 5×2 pixels. In this case, the target pixel to be a target of the noise reduction processing is the brightness signal Y and the color difference signal Cb, while the color difference signal Cr is not a target.

If the target pixel location is different, there might be a case in which the color difference signal Cr is present, while the color difference signal Cb is not present contrary to the above. In the following, a pixel in the local area is expressed as $C_{ij}$ (C is a brightness or color difference signal and C=Y, Cb, Cr, i is x-coordinate and i=0 to 4, and j is y-coordinate and j=0, 2, 4, 6, 8 in the case of an even number field signal and j=1, 3, 5, 7, 9 in the case of an odd number field signal). With regard to the color difference signal, a pixel lost in the local area of 5×5 pixels is not a target of processing.

With regard to the target pixel, in the case of the even number field signal, the brightness signal is $Y_{24}$, the color difference signal is $Cr_{24}$ or $Cb_{24}$, while in the case of the odd number field signal, the brightness signal is $Y_{25}$, the color difference signal is $Cr_{25}$ or $Cb_{25}$. The following explanation will be made on the even number field signal and the target pixel of $Y_{24}$, $Cr_{24}$, as shown in FIG. 14B but it is also true for the even number field signal and the target pixel of $Y_{24}$, $Cb_{24}$ or the odd number field signal only except that the configuration of the local area is different. The extracted local area is transferred to the first noise reduction unit 601 and the second noise reduction unit 602.

The first noise reduction unit 601 estimates a random noise amount $N_{24}$ concerning the target pixel $C_{24}$ from a low frequency component of the local area on the basis of the control of the control unit 117. After that, using the estimated noise amount $N_{24}$, a low-pass filter is selected and the low-pass filtering processing is applied to the local area so as to execute the random noise reduction processing. In the following, the target pixel subjected to the random noise reduction processing in the first noise reduction unit 601 is described as $C^{N1}{}_{24}$.

The target pixel $C^{N1}{}_{24}$ subjected to the random noise reduction processing is transferred to the combining unit 603. On the other hand, the second noise reduction unit 602 calculates an index coefficient IC indicating a degree of an impulsive noise from the local area of the brightness signal on the basis of the control of the control unit 117 for the target pixel $Y_{24}$ and its neighboring eight pixels $Y_{12}, Y_{22}, Y_{32}, Y_{14}, Y_{44}, Y_{16}, Y_{26},$ and $Y_{36}$. For the color difference signal, the index coefficient IC is not calculated but the index coefficient IC of the brightness signal is used. In the following, the index coefficient of the target pixel $C_{24}$ is noted as $IC_0$ and the index coefficients of the neighboring eight pixels as $IC_1$ to $IC_8$, and the entire index coefficients as $IC_k$ (k=0 to 8). Also, the target pixel $C_{24}$ is noted as $C_0$, the neighboring eight pixels as $C_1$ to $C_8$, and all the nine pixels as $C_k$ in a simplified manner as necessary.

After that, weighting coefficients of the target pixel and the neighboring eight pixels are acquired using the index coefficient $IC_k$, and weighting filtering processing is applied so as to perform the impulsive noise reduction processing. In the following, the target pixel subjected to the impulsive noise reduction processing at the second noise reduction unit 602 is described by $C^{N2}{}_{24}$. The index coefficient $IC_0$ of the target pixel $Y_{24}$ of the brightness signal and the target pixel $C^{N2}{}_{24}$ subjected to the impulsive noise reduction processing are transferred to the combining unit 603.

The combining unit 603 performs combination processing of the target pixel $C^{N1}{}_{24}$ subjected to the random noise reduction processing at the first noise reduction unit 601 and the target pixel $C^{N2}{}_{24}$ subjected to the impulsive noise reduction processing using the index coefficient $IC_0$ transferred from the second noise reduction unit 602 on the basis of the control of the control unit 117 so as to acquire the target pixel $C^N{}_{24}$ after the combination as shown in the equation (1). The combination coefficient w is acquired from the index coefficient $IC_0$ of the brightness signal and used in common for combination of the brightness signal and the color difference signal. The target pixel $C^N{}_{24}$ after the combination is transferred to the buffer 604.

The buffer 604 is capable of recording two field signals, that is, one frame signal and sequentially overwritten with progress of shooting. The processing in the brightness color separation and extraction unit 600, the first noise reduction unit 601, the second noise reduction unit 602, and the combination unit 603 is performed in synchronization by the unit of local area on the basis of the control at the control unit 117.

The synchronization unit 605 reads the even number field signal and the odd number field signal subjected to the combination processing from the buffer 604 on the basis of the control of the control unit 117. After performing known interpolation processing for the color difference signal, the synchronization unit 605 generates a frame signal by performing known synchronization processing for the even number field signal and the odd number field signal. The generated frame signal is transferred to the signal processing unit 115.

Figure 15:
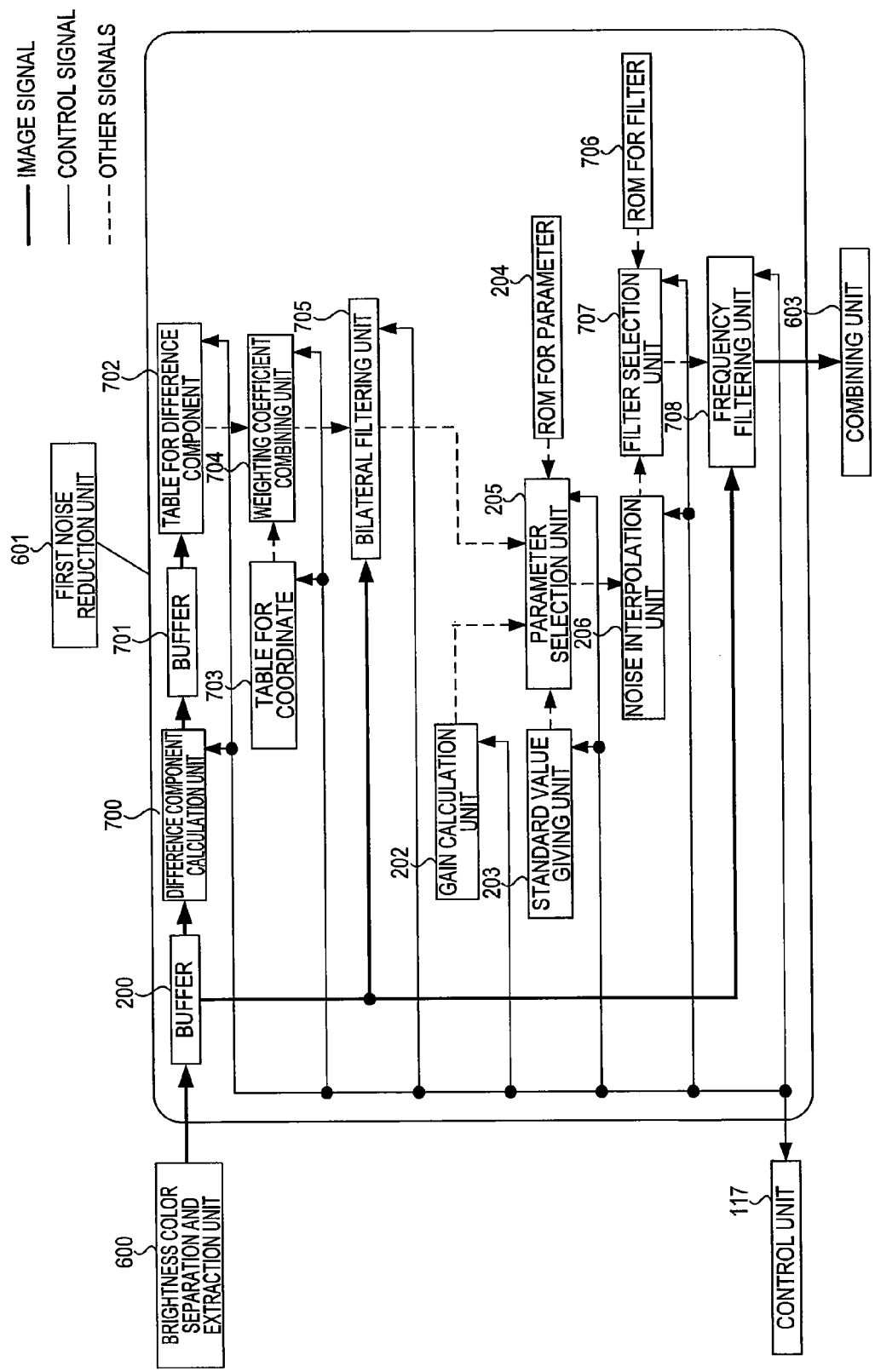
FIG. 15 is a configuration diagram of a first noise reduction unit.

FIG. 15 shows an example of a configuration of the first noise reduction unit 601, in which the average value calculation unit 201 and the coring unit 207 are omitted from the configuration of the first noise reduction unit 112 shown in FIG. 3 and a difference component calculation unit 700, a buffer 701, a table for difference component 702, a table for coordinate 703, a weighting coefficient combination unit 704, a bilateral filtering unit 705, a ROM for filter 706, a filter selection unit 707, and a frequency filtering unit 708 are added. The basic configuration is equal to the first noise reduction unit 112 shown in FIG. 3, and the same names and reference numerals are allocated to the same configurations. Only different portions will be described below.

From the brightness color separation and extraction unit 600, as shown in FIGS. 14B and 14C, a local area of 5×5 pixels is sequentially transferred to the buffer 200 for each of Y, Cb, and Cr. With regard to the color difference signal, a pixel lost in the local area of 5×5 pixels is not a target of the processing. The following explanation will be made for the even number field signal and the target pixel of $Y_{24}$, $Cr_{24}$ as shown in FIG. 14B, but it is also true to the even number field signal and the target pixel of $Y_{24}$, $Cb_{24}$ and the odd number field signal only except that the configuration of the local area is different.

The difference component calculation unit 700 reads the local area from the buffer 200 and calculates an absolute value of difference component $\delta_{ij}$ from the target pixel value $C_{24}$ on the basis of the control of the control unit 117 as shown in an equation (15):

$$\delta_{ij}=|C_{ij}-C_{24}| \tag{15}$$

The absolute value $\delta_{ij}$ of a difference component is transferred to the buffer 701.

The table 702 for difference component reads the absolute value $\delta_{ij}$ of a difference component from the buffer 701 and acquires a first weighting coefficient $w1_{ij}$ corresponding to the absolute value $\delta_{ij}$ of a difference component on the basis of the control of the control unit 117. The first weighting coefficient $w1_{ij}$ is acquired by a function expression shown in an equation (16), for example:

$$w1_{ij} = e^{-\frac{\delta_{ij}^2}{2\sigma1^2}} \tag{16}$$

Reference character a $\sigma1$ in the equation (16) is a parameter for adjustment and approximately a $\sigma1=1$ to 10 is used. The table 702 for difference component is a table recording the first weighting coefficient $w1_{ij}$ calculated in advance on the basis of the function expression shown in the equation (16). The acquired first weighting coefficient $w1_{ij}$ is transferred to the weighting coefficient combining unit 704.

The weighting coefficient combining unit 704 reads the first weighting coefficient $w1_{ij}$ from the table 702 for difference component and a second weighting coefficient $w2_{ij}$ corresponding to a coordinate value (i, j) from the table 703 for coordinate and combines them on the basis of the control of the control unit 117. The second weighting coefficient $w2_{ij}$ is determined by a function expression shown in an equation (17), for example:

$$w2_{ij} = e^{-\frac{(i-Ti)^2+(j-Tj)^2}{2\sigma2^2}} \tag{17}$$

Reference character $\sigma2$ in the equation (17) is a parameter for adjustment and approximately $\sigma2=1$ to 10 is used. Also, Ti and Tj refer to coordinates of the target pixel, and they are Ti=2, Tj=4 in the second embodiment.

The table 703 for coordinate is a table recording the second weighting coefficient $w2_{ij}$ calculated in advance on the basis of the function expression shown in the equation (17). The first weighting coefficient $w1_{ij}$ and the second weighting coefficient $w2_{ij}$ are combined on the basis of an equation (18), and a weighting coefficient $w_{ij}$ is calculated:

$$w_{ij} = w1_{ij} \cdot w2_{ij} \quad (18)$$

The calculated weighting coefficient $w_{ij}$ is transferred to the bilateral filtering unit 705.

The bilateral filtering unit 705 performs bilateral filtering processing using the weighting coefficient $w_{ij}$ from the weighting coefficient combining unit 704 for the local area from the buffer 200 on the basis of the control of the control unit 117.

$$C\_Bi = \frac{\sum_{i,j} w_{ij} \cdot C_{ij}}{\sum_{i,j} w_{ij}} \quad (19)$$

A result C_Bi of the bilateral filtering processing shown in an equation (19) is transferred to the parameter selection unit 205.

The parameter selection unit 205 sets signal level 1 from the result C_Bi of the bilateral filtering processing from the bilateral filtering unit 705, the gain g from the gain information from the gain calculation unit 202, and the temperature t from the temperature information from the control unit 117. Subsequently, the coordinate data $(L_n, N_n)$ and $(L_{n+1}, N_{n+1})$ of the section to which the signal level 1 belongs and the correction coefficient $K_{gt}$ are searched from the ROM 204 for parameter and transferred to the noise interpolation unit 206.

The noise interpolation unit 206 calculates the reference noise amount $N_1$ in the reference noise model from the equation (5) on the basis of the control of the control unit 117 and calculates the noise amount N on the basis of the equation (6) from the correction coefficient $K_g$. The noise amount N is transferred to the filter selection unit 707 as the noise amount $N_{24}$ of the target pixel $C_{24}$. In the process of the noise amount calculation, there is no need to acquire information such as the temperature t, the gain g and the like for each shooting. It may be so configured that arbitrary information is recorded in advance in the standard value giving unit 203 and the calculation process is omitted.

The filter selection unit 707 selects a filter coefficient to be used in the filtering processing from the ROM 706 for filter using the noise amount $N_{24}$ from the noise interpolation unit 206 on the basis of the control of the control unit 117.

Figures 16, 17:
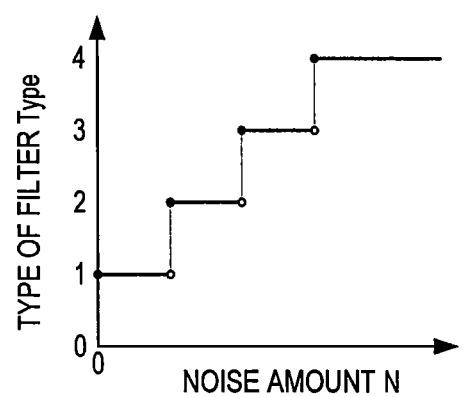
FIG. 16 is an explanatory diagram concerning a frequency filter.
FIG. 17 is an explanatory diagram concerning selection of the frequency filter.

FIG. 16 shows an example of the filter coefficient recorded in the ROM 706 for filter, and four types of frequency characteristics from Type 1 to Type 4 in a size of 5×5 pixels are recorded. Each coefficient is increased by 128 times. The frequency characteristics are such that a high frequency component remains in the Type 1 while the high frequency component is suppressed sequentially toward the Type 4.

The filter selection unit 707 selects the frequency characteristics of the Type 1 to the Type 4 from the noise amount $N_{24}$. This selection is made on the basis of a relationship between the noise amount $N_{24}$ and the filter type Type, for example, shown in FIG. 17. The more the noise amount $N_{24}$ is, the frequency characteristic with the higher frequency component suppressed is selected. The filter selection unit 707 transfers the selected filter coefficient to the frequency filtering unit 708.

The frequency filtering unit 708 performs frequency filtering processing using a filter coefficient from the filter selection unit 707 for the local area from the buffer 200 on the basis of the control of the control unit 117. In the case of the brightness signal Y, the local area of 5×5 pixels matches the filter size, but in the case of the color difference signal Cr, the local area of 5×3 pixels does not match the filter size. In this case, a pixel, which is not present, is eliminated from targets for the filtering processing and handled by normalization on the basis of the filter coefficient of actually used pixels. A result of the frequency filtering processing is transferred to the combining unit 603 as the target pixel $C^{N1}{}_{24}$ subjected to the random noise reduction processing.

Figure 18:
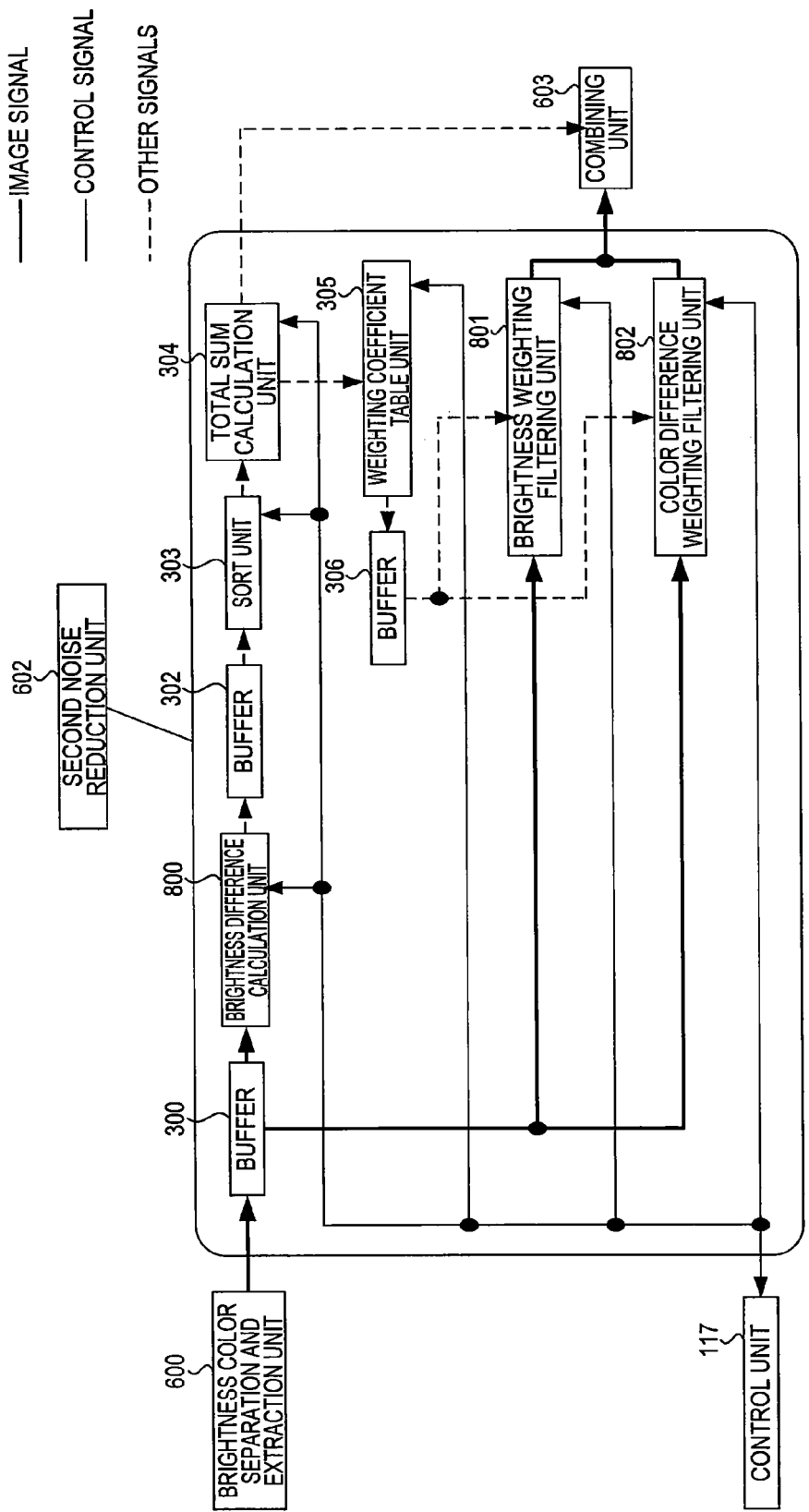
FIG. 18 is a configuration diagram of a second noise reduction unit.

FIG. 18 shows an example of the configuration of the second noise reduction unit 602 configured such that the difference calculation unit 301 is substituted by the brightness difference calculation unit 800 and the weighting filtering unit 307 is substituted by the brightness weighting filtering unit 801 and the color difference weighting filtering unit 802, in the configuration of the second noise reduction unit 113 shown in FIG. 6. The basic configuration is equal to the second noise reduction unit 113 shown in FIG. 6, and the same names and reference numerals are allocated to the same configurations. Only different portions will be described below.

The brightness color separation and extraction unit 600 is connected to the brightness difference calculation unit 800, the brightness weighting filtering unit 801, and the color difference weighting filtering unit 802 through the buffer 300. The brightness difference calculation unit 800 is connected to the buffer 302. The buffer 306 is connected to the brightness weighting filtering unit 801 and the color difference weighting filtering unit 802. The brightness weighting filtering unit 801 and the color difference weighting filtering unit 802 are connected to the combining unit 603. The control unit 117 is bidirectionally connected to the brightness difference calculation unit 800, the brightness weighting filtering unit 801, and the color difference weighting filtering unit 802.

From the brightness color separation and extraction unit 600, as shown in FIGS. 14B and 14C, a local area of 5×5 pixels is sequentially transferred to the buffer 300 for each of Y, Cb, and Cr. With regard to the color difference signal, a pixel lost in the local area of 5×5 pixels is not a target of processing. The following explanation will be made for the even number field signal and the target pixel of $Y_{24}$, $Cr_{24}$ as shown in FIG. 14B, but it is also true to the even number field signal and the target pixel of $Y_{24}$, $Cb_{24}$ and the odd number field signal only except that the configuration of the local area is different.

The brightness difference calculation unit 800 calculates the absolute values of differences $\Delta_1$ from the neighboring eight pixels as shown in the equation (8) for each of the target pixel $Y_{24}$ of the brightness signal and its neighboring eight pixels $Y_{12}, Y_{22}, Y_{32}, Y_{14}, Y_{34}, Y_{16}, Y_{26}$, and $Y_{36}$, totaling in nine elements, on the basis of the control of the control unit 117. The absolute values of differences $\Delta_1$ are transferred to the buffer 302.

The sort unit 303 sorts the absolute values of differences $\Delta_1$ in the buffer 302 in the ascending order on the basis of the control of the control unit 117 and transfers them in the predetermined number from the smallest, four values in the second embodiment to the total sum calculation unit 304.

The total sum calculation unit 304 acquires the total sum of the four absolute values of differences sorted in the ascending order, which are transferred from the sort unit 303 as shown in the equation (9) on the basis of the control of the control unit 117. The total sum is the index coefficient IC.

The weighting coefficient table unit 305 outputs a weighting coefficient F to be used for the weighting filtering processing in latter part on the basis of the index coefficient IC. The weighting coefficient F is transferred to the buffer 306. The brightness difference calculation unit 800, the sort unit 303, the total sum calculation unit 304, and the weighting coefficient table unit 305 repeat the above processing nine times on the basis of the control of the control unit 117. In the following, the index coefficient is noted as $IC_k$, and the weighting coefficient is noted as $F_k$. The total sum calculation unit 304 transfers only the index coefficient $IC_0$ of the target pixel $Y_{24}$ of the brightness signal also to the combining unit 603.

The brightness weighting filtering unit 801 reads the target pixel and its neighboring eight pixels of the brightness signal in the local area from the buffer 300 and the weighting coefficient $F_k$ from the buffer 306 on the basis of the control of the control unit 117, performs the weighting filtering processing shown in the equation (11) and acquires the target pixel $Y^{N2}{}_{24}$ which has been subjected to the impulsive noise reduction processing. The target pixel $Y^{N2}{}_{24}$ which has been subjected to the impulsive noise reduction processing is transferred to the combining unit 603.

The color difference weighting filtering unit 802 reads the target pixel and its neighboring eight pixels of the color difference signal in the local area from the buffer 300 and the weighting coefficient $F_k$ from the buffer 306 on the basis of the control of the control unit 117, performs the weighting filtering processing shown in the equation (11) and acquires the target pixel $Cr^{N2}{}_{24}$ which has been subjected to the impulsive noise reduction processing. That is, the color difference signal is processed by the weighting coefficient $F_k$ acquired on the basis of the index coefficient $IC_k$ of the brightness signal. The degree of impulsiveness can be obtained only from the brightness signal with sufficient accuracy. By adapting this result to the color difference signal, without performing processing causing an error such as interpolation processing for the color difference signal in which a defective pixel is present, the impulsive noise reduction can be realized with high accuracy. The target pixel $Cr^{N2}{}_{24}$ which has been subjected to the impulsive noise reduction processing is transferred to the combining unit 603.

Figure 19:
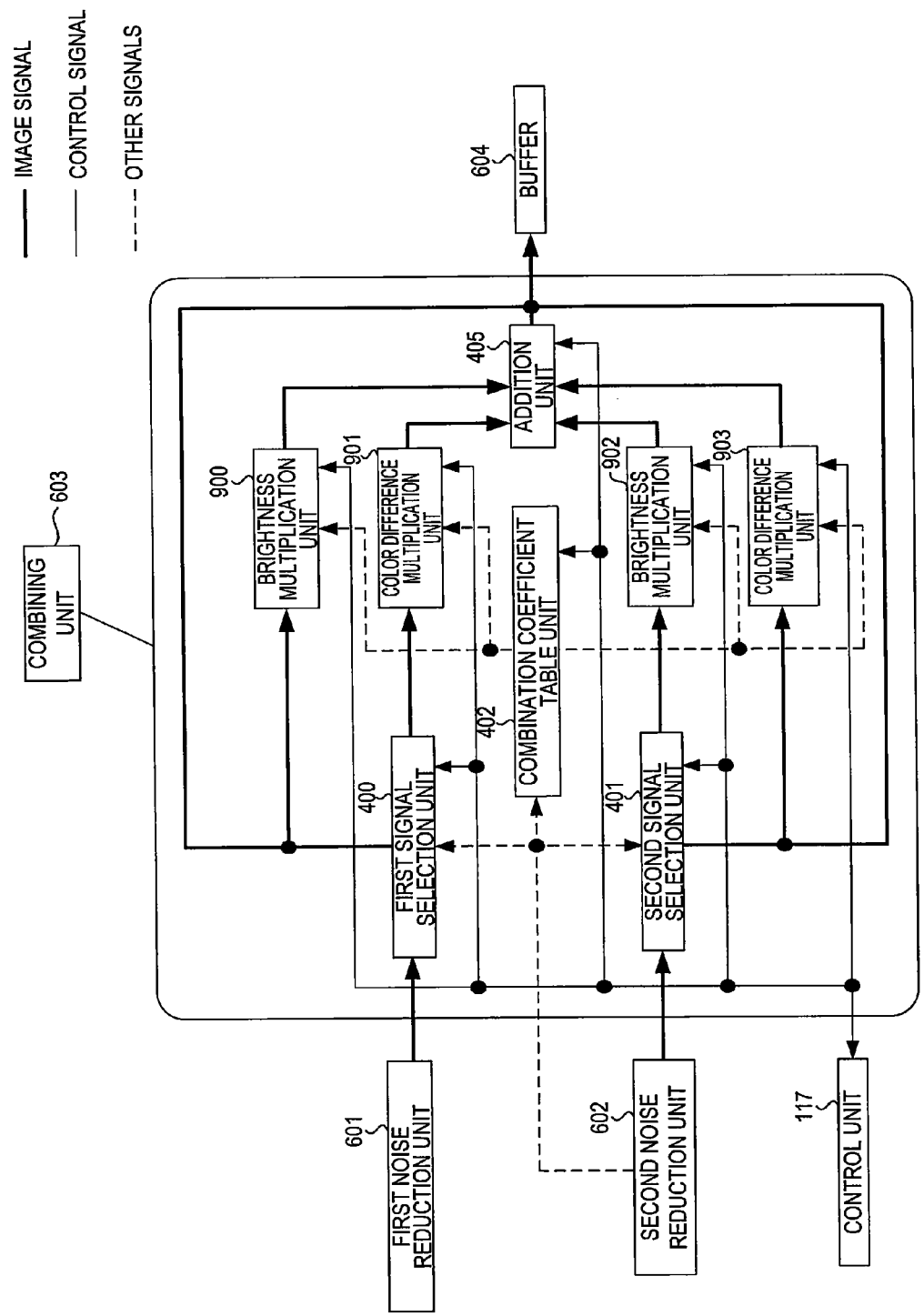
FIG. 19 is a configuration diagram of a combining unit.

FIG. 19 shows an example of the configuration of the combining unit 603, in which the multiplication unit 403 is substituted by a brightness multiplication unit 900 and a color difference multiplication unit 901 and the multiplication unit 404 is substituted by the brightness multiplication unit 902 and the color difference multiplication unit 903, in the configuration of the combining unit 114 shown in FIG. 9. The basic configuration is equal to the combining unit 114 shown in FIG. 9, and the same names and reference numerals are allocated to the same configurations. Only the different portions will be described below.

The first noise reduction unit 601 is connected to the first signal selection unit 400. The second noise reduction unit 602 is connected to the first signal selection unit 400, the second signal selection unit 401, and the combination coefficient table unit 402. The first signal selection unit 400 is connected to the brightness multiplication unit 900, the color difference multiplication unit 901, and the buffer 604. The second signal selection unit 401 is connected to the brightness multiplication unit 902, the color difference multiplication unit 903, and the buffer 604. The combination coefficient table unit 402 is connected to the brightness multiplication unit 900, the color difference multiplication unit 901, the brightness multiplication unit 902, and the color difference multiplication unit 903. The brightness multiplication unit 900, the color difference multiplication unit 901, the brightness multiplication unit 902, and the color difference multiplication unit 903 are connected to the addition unit 405, and the addition unit 405 is connected to the buffer 604. The control unit 117 is bidirectionally connected to the brightness multiplication unit 900, the color difference multiplication unit 901, the brightness multiplication unit 902, and the color difference multiplication unit 903. The following explanation will be made for the even number field signal and the target pixel of $Y_{24}$, $Cr_{24}$ as shown in FIG. 14B, but it is also true to the even number field signal and the target pixel of $Y_{24}$, $Cb_{24}$ and the odd number field signal only except that the configuration of the local area is different.

The first signal selection unit 400 reads the index coefficient $IC_0$ relating to the target pixel $Y_{24}$ of the brightness signal from the second noise reduction unit 602 and the target pixel $C^{N1}{}_{24}$ of the brightness and color difference signals subjected to the random noise reduction processing from the first noise reduction unit 601 on the basis of the control of the control unit 117. If the index coefficient $IC_0$ is not more than the predetermined threshold value Th1, the target pixel $C^{N1}{}_{24}$ is transferred to the buffer 604 as the target pixel $C^{N}{}_{24}$ after combination. If the index coefficient $IC_0$ is more than the predetermined threshold value Th1, the target pixel $Y^{N1}{}_{24}$ of the brightness signal is transferred to the brightness multiplication unit 900 and the target pixel $Cr^{N1}{}_{24}$ of the color difference signal is transferred to the color difference multiplication unit 901.

The second signal selection unit 401 reads the index coefficient $IC_0$ relating to the target pixel $Y_{24}$ of the brightness signal and the target pixel $C^{N2}{}_{24}$ of the brightness and color difference signals subjected to the impulsive noise reduction processing from the second noise reduction unit 602 on the basis of the control of the control unit 117. If the index coefficient $IC_0$ is not smaller than the predetermined threshold value Th2, the target pixel $C^{N2}{}_{24}$ is transferred to the buffer 604 as the target pixel $C^{N}{}_{24}$ after combination. If the index coefficient $IC_0$ is smaller than the predetermined threshold value Th2, the target pixel $Y^{N2}{}_{24}$ of the brightens signal is transferred to the brightness multiplication unit 902 and the target pixel $Cr^{N2}{}_{24}$ of the color difference signal is transferred to the color difference multiplication unit 903.

The combination coefficient table unit 402 is a lookup table recording combination coefficients w=0 to 1 and 1−w used for the combination processing for the index coefficient $IC_0$ as shown in FIG. 10. The combination coefficient table unit 402 transfers the combination coefficient 1−w to the brightness multiplication unit 900 and the color difference multiplication unit 901 and the combination coefficient w to the brightness multiplication unit 902 and the color difference multiplication unit 903.

The brightness multiplication unit 900 multiplies the target pixel $Y^{N1}{}_{24}$ by the combination coefficient 1−w on the basis of the control of the control unit 117 if the target pixel $Y^{N1}{}_{24}$ of the brightness signal is transferred from the first signal selection unit 400 and transfers the result $(1-w) \cdot Y^{N1}{}_{24}$ to the addition unit 405.

The color difference multiplication unit 901 multiplies the target pixel $Cr^{N1}{}_{24}$ by the combination coefficient 1−w on the basis of the control of the control unit 117 if the target pixel $Cr^{N1}{}_{24}$ is transferred from the first signal selection unit 400 and transfers the result $(1-w) \cdot Cr^{N1}{}_{24}$ to the addition unit 405.

The brightness multiplication unit 902 multiplies the target pixel $Y^{N2}{}_{24}$ by the combination coefficient w on the basis of the control of the control unit 117 if the target pixel $Y^{N2}{}_{24}$ of the brightness signal is transferred from the second signal selection unit 401 and transfers the result $w \cdot Y^{N2}{}_{24}$ to the addition unit 405.

The color difference multiplication unit 903 multiplies the target pixel $Cr^{N2}{}_{24}$ by the combination coefficient w on the basis of the control of the control unit 117 if the target pixel $Cr^{N2}{}_{24}$ of the color difference signal is transferred from the second signal selection unit 401 and transfers the result $w \cdot Cr^{N2}{}_{24}$ to the addition unit 405.

The addition unit 405 performs addition processing of $(1-w) \cdot Y^{N1}{}_{24}$ from the brightness multiplication unit 900 and $w \cdot Y^{N2}{}_{24}$ from the brightness multiplication unit 902 and acquires a target pixel $Y^{N}{}_{24}$ of the brightness signal after combination on the basis of the control of the control unit 117. Similarly, the portion performs addition processing of $(1-w) \cdot Cr^{N1}{}_{24}$ from the color difference multiplication unit 901 and $w \cdot Cr^{N2}{}_{24}$ from the color difference multiplication unit 903 and acquires a target pixel $Cr^{N}{}_{24}$ of the color difference signal after combination. That is, the color difference signal is subjected to the combination processing using the combination coefficient w acquired on the basis of the index coefficient $IC_k$ of the brightness signal. The degree of impulsiveness can be obtained only from the brightness signal with sufficient accuracy. By adapting this result to the color difference signal, the combination processing with high accuracy is realized. The target pixel $C^{N}{}_{22}$ of the brightness and color difference signals subjected to the combination processing is transferred to the buffer 604.

[Action]

With the above configuration, the reduction processing can be applied to the random noise and the impulsive noise having different natures independently and the both can be subjected to the combination processing on the basis of the index coefficient indicating the degree of the impulsiveness. Thus, the optimal noise reduction processing can be performed for the both random and impulsive noises, and a high quality image signal can be obtained.

Also, occurrence of discontinuity or artifact caused by two types of noise reduction processing can be suppressed. Since the random noise reduction processing is performed by estimating the noise amount by the unit of target pixel, only the noise component can be reduced with high accuracy, and a high quality image signal can be obtained.

The configuration using the processing result of the bilateral filter for estimation of the noise amount acquires a low frequency component by eliminating the noise or edge structure around the target pixel, and highly accurate and stable processing is realized. The estimation of the noise amount dynamically adapts to conditions which are different for each shooting, and highly accurate and stable estimation of the noise amount becomes possible. Also, the configuration using the interpolation calculation for calculation of the noise amount can be easily implemented and cost reduction of the system can be realized.

Also, since the frequency filtering processing selected on the basis of the noise amount is used for the random noise reduction processing, only the random noise component can be reduced with an emphasis, and a high quality image signal can be obtained. Also, the filtering processing can be implemented relatively easily, and speed up and cost reduction of the entire system can be realized.

In the impulsive noise reduction processing, with the configuration in which the degree of impulsiveness is acquired by the unit of pixel of the local area and the weighting filtering processing is performed, only the noise component can be reduced with high accuracy. Also, since the weighting coefficient is acquired from the lookup table, high speed processing can be realized. In the index coefficient indicating the degree of the impulsiveness, with the configuration in which the difference from the neighboring pixel is sorted and the total sum of the predetermined number from the smallest value is used, the impulsive noise and the edge portion can be distinguished with high accuracy, and a high quality image signal with less deterioration of the edge portion can be obtained.

Also, since the brightness signal and the color difference signal are separated from the image signal, and the noise reduction processing is performed for the brightness signal and the color difference signal independently, the noise can be reduced with high accuracy, and a high quality image signal can be obtained. Also, the present invention can be adapted to a variety of image pickup systems.

Moreover, in the impulsive noise reduction and combination processing, since the color difference signal is processed on the basis of the processing result of the brightness signal, the processing is unified between the brightness signal and the color difference signal, and a high quality image signal with less artifact can be obtained.

Moreover, the color difference line sequential complementary filter has high affinity with the current image pickup system and enables combinations with a variety of the systems.

[Variation]

In the second embodiment, the color difference line sequential complementary filter is used as the image pickup element, but the configuration does not have to be limited to that. For example, a configuration using the Bayer type primary color filter shown in FIG. 2A can also be employed. In this case, a lost RGB signal is complemented by known interpolation processing and the brightness signal Y and the color difference signals Cb and Cr are acquired on the basis of an equation (20):

$$Y = 0.29900R + 0.58700G + 0.11400B$$

$$Cb = -0.16874R - 0.33126G + 0.50000B$$

$$Cr = 0.50000R - 0.41869G - 0.081318 \qquad (20)$$

In this case, there is only a frame signal, and a field signal is not present. Moreover, similarly to the form shown in FIG. 11 in the first embodiment, such configuration is also possible that a plurality of image signals continuous in a time series picked up by a separate image pickup unit are processed in an unprocessed raw data form and further from a recording medium recording incidental information such as a color filter of the CCD 102, an exposure information at the shooting and the like.

Moreover, the processing by hardware is assumed in the second embodiment, but the configuration does not have to be limited to that. For example, such configuration is also possible that a plurality of image signals continuous in a time series from the CCD 102 as unprocessed raw data and the incidental information such as the color filter of the CCD 102, the exposure information at shooting and the like as the header information are outputted and processed by software.

The software may be stored in a computer readable storage medium such as a magnetic disk, a magneto-optical disk, a CD-ROM, a DVD-ROM, and a semiconductor memory. Further, the software may be distributed to a computer over a communication line.

Figure 20A:
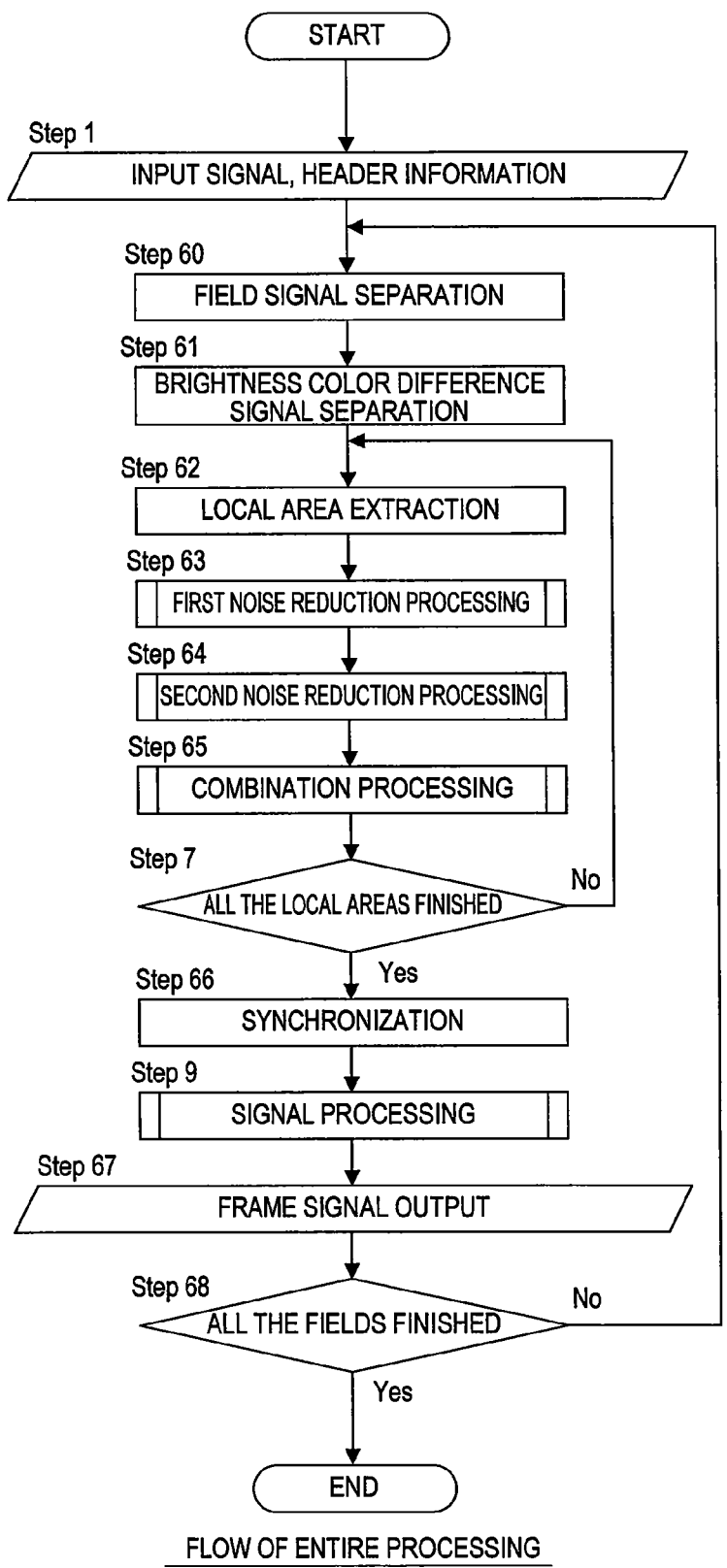
FIG. 20A is a flowchart concerning entire processing in a flow of signal processing in the second embodiment.

FIG. 20A shows a flow relating to the software processing of the signal processing. The same step numbers are allocated to the same processing steps as those in the flow of the signal processing in the first embodiment shown in FIG. 12A.

At Step S1, a plurality of image signals and header information such as a color filter and an exposure information at shooting are read.

At Step S60, an even number field signal and an odd number field signal are sequentially extracted from a single image signal, that is, a frame signal.

At Step S61, the image signal is separated to a brightness signal and a color signal as shown in the equation (14).

At Step S62, a local area with a predetermined size, that is, 5×5 pixels, for example, including a target pixel to be a target of the noise reduction processing is extracted as shown in FIGS. 14B and 14C for the brightness signal and the color difference signal.

At Step S63, the first noise reduction processing as the random noise reduction processing, which will be described separately, is performed for the brightness signal and the color difference signal.

At Step S64, the second noise reduction processing as the impulsive noise reduction processing, which will be described separately, is performed for the brightness signal and the color difference signal.

At Step S65, a signal subjected to the first noise reduction processing and a signal subjected to the second noise reduction processing are combined for the brightness signal and the color difference signal as will be described separately.

At Step S7, it is determined if all the local areas have been completed, and if not, the routine branches to Step S62, while if completed, the routine branches to Step S66.

At Step S66, known interpolation processing is performed for the color difference signal and then, known synchronization processing is preformed for the even number field signal and the odd number field signal so as to generate a frame signal.

At Step S9, signal processing such as known gradation conversion processing, edge enhancing processing, color enhancing processing and the like is performed.

At Step S67, the frame signal for which the processing has been completed is outputted.

At Step S68, it is determined if all the field signals have been completed or not, and if not, the routine branches to Step S60, while if completed, the routine is finished.

Figure 20B:
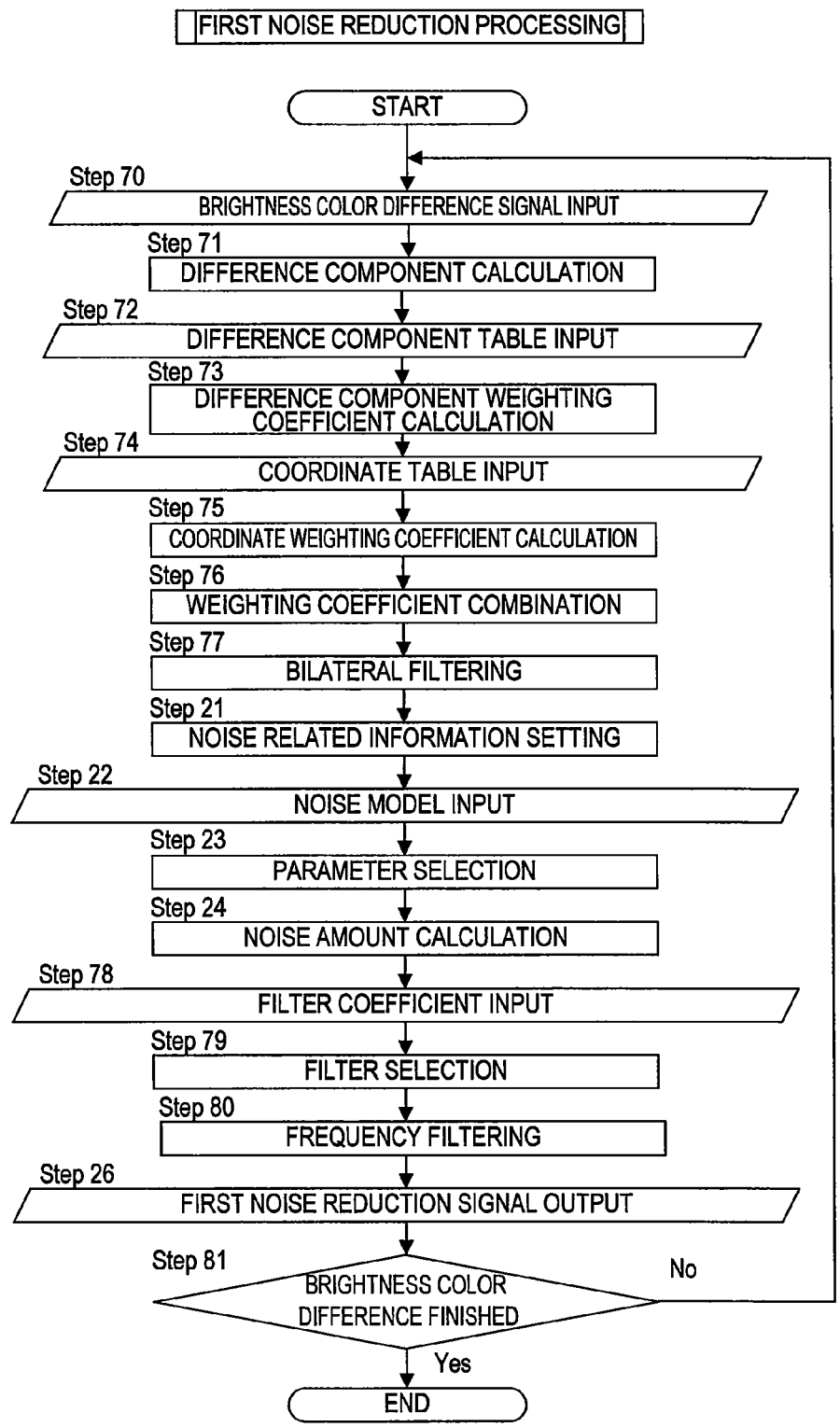
FIG. 20B is a flowchart concerning first noise reduction processing in the flow of signal processing in the second embodiment.

FIG. 20B is a flow relating to the first noise reduction processing at Step S63. The same step numbers are allocated to the same processing steps as those in the flow of the first noise reduction processing in the first embodiment shown in FIG. 12B.

At Step S70, the local area of the brightness or color difference signal is inputted.

At Step S71, an absolute value of difference component from a target pixel value shown in the equation (15) is calculated.

At Step S72, a difference component table constructed on the basis of the function expression shown in the equation (16) is inputted.

At Step S73, a weighting coefficient relating to the difference component is acquired.

At Step S74, a coordinate table constructed on the basis of the function expression shown in the equation (17) is inputted.

At Step S75, a weighting coefficient relating to the coordinate is acquired.

At Step S76, a weighting coefficient used for a bilateral filter is acquired by multiplying the weighting coefficient relating to the difference component by the weighting coefficient relating to the coordinate.

At Step S77, bilateral filtering processing shown in the equation (19) is performed.

At Step S21, information such as temperature, gain and the like is set from the read header information. If there is no required parameter in the header information, a predetermined standard value is allocated.

At Step S22, a coordinate data and a correction coefficient of a reference noise model are read.

At Step S23, the coordinate data and a corresponding correction coefficient for a section of the reference noise model to which the target pixel belongs are selected.

At Step S24, a noise amount is acquired by the interpolation processing shown in the equations (5) and (6) using the result of the bilateral filtering processing as a signal level.

At Step S78, a filter coefficient as shown in FIG. 16 is inputted.

At Step S79, a filter coefficient is selected from the noise amount on the basis of a relationship as shown in FIG. 17.

At Step S80, frequency filtering processing is performed using the selected filter coefficient.

At Step S26, a signal subjected to the first noise reduction processing is outputted.

At Step S81, it is determined if the processing of the brightness and color difference signals has been completed or not, and if not completed, the routine branches to Step S70, while if completed, the routine is finished.

Figure 20C:
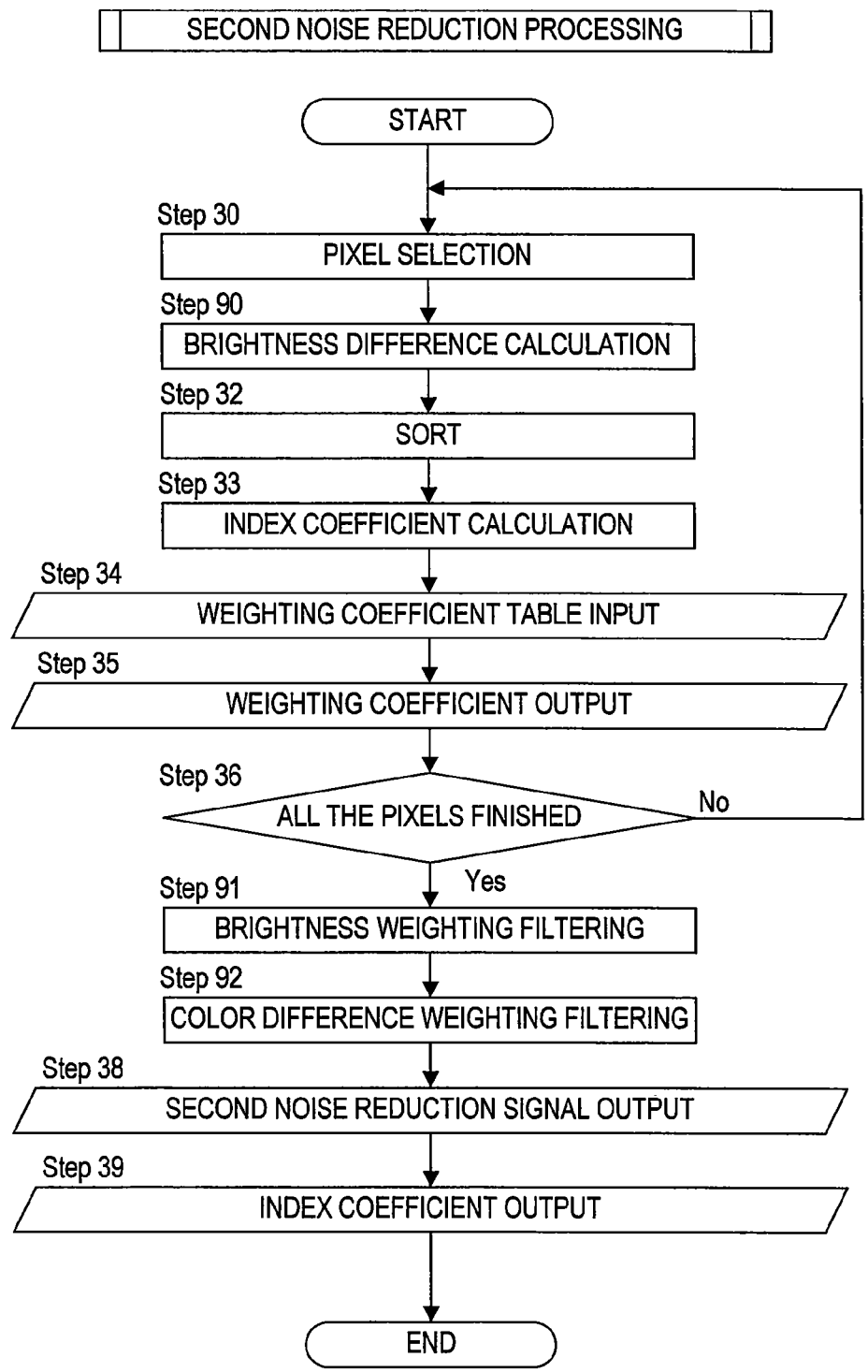
FIG. 20C is a flowchart concerning second noise reduction processing in the flow of signal processing in the second embodiment.

FIG. 20C is a flow relating to the second noise reduction processing at Step S64. The same step numbers are allocated to the same processing steps as those in the flow of the second noise reduction processing in the first embodiment shown in FIG. 12C.

At Step S30, a target pixel in the local area of the brightness signal and one of the neighboring eight pixels are selected.

At Step S90, absolute values of eight differences are calculated as shown in the equation (8).

At Step S32, the absolute values of the eight differences are sorted in the ascending order.

At Step S33, the total sum of the absolute values of differences in a predetermined number from the smallest, four differences, for example, is acquired as shown in the equation (9) and made an index coefficient.

At Step S34, a lookup table with the index coefficient as an input and a weighting coefficient as an output, constructed on the basis of the equation (10) is inputted.

At Step S35, the weighting coefficient is outputted on the basis of the index coefficient.

At Step S36, it is determined if the target pixel and all the neighboring eight pixels have been selected or not, and if the selection has not been completed, the routine branches to Step S30, while if completed, the routine branches to Step S91.

At Step S91, weighting filtering processing shown in the equation (11) is performed for the brightness signal.

At Step S92, weighting filtering processing shown in the equation (11) is performed for the color difference signal.

At Step S38, a signal obtained by the weighting filtering processing is outputted as a signal subjected to the second noise reduction processing for the brightness signal and the color difference signal.

At Step S39, the index coefficient relating to the target pixel of the brightness signal is outputted and finished.

Figure 20D:
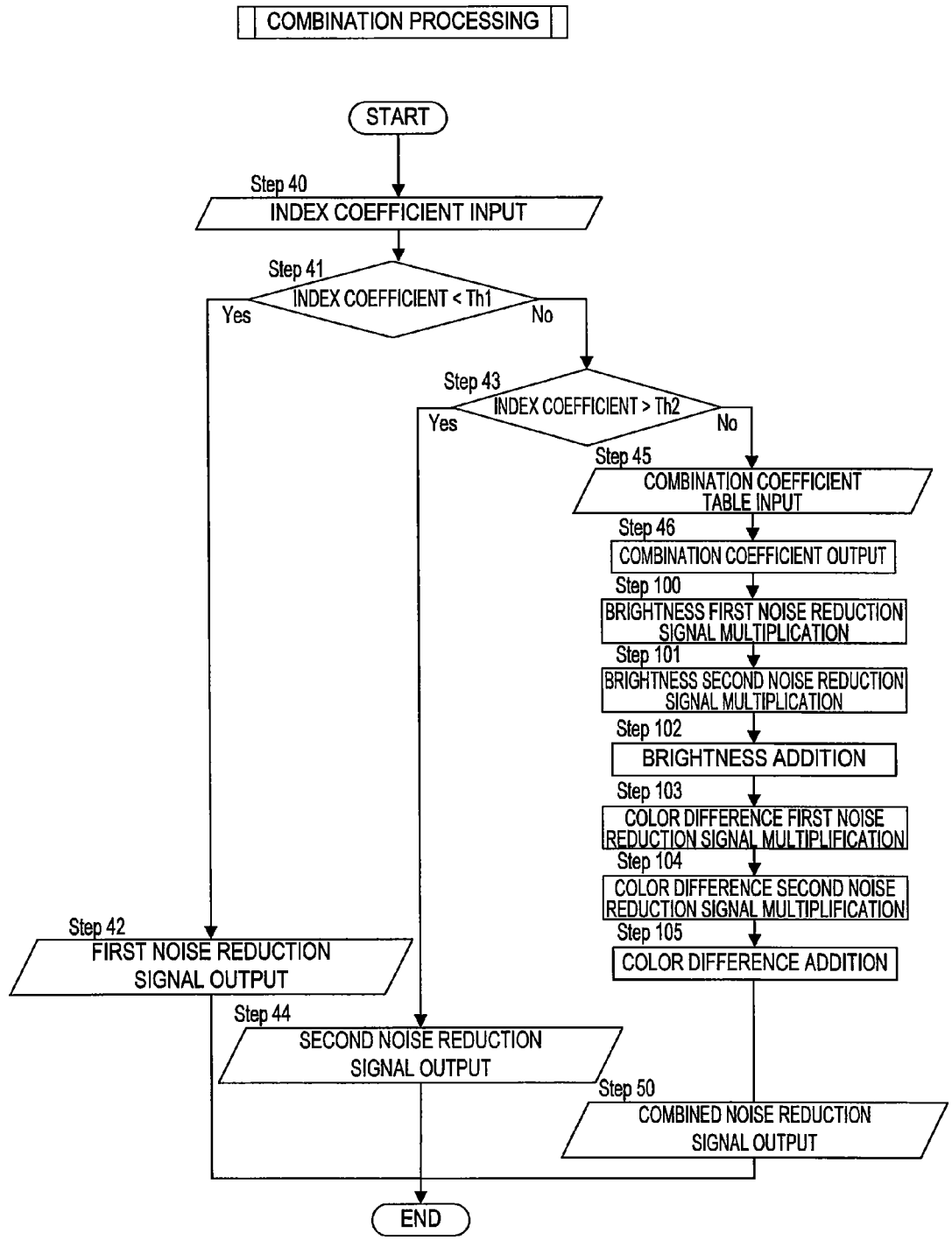
FIG. 20D is a flowchart concerning combination processing in the flow of signal processing in the second embodiment.

FIG. 20D is a flow relating to the combination processing at Step S65. The same step numbers are allocated to the same processing steps as those in the flow of the combination processing in the first embodiment shown in FIG. 12D.

At Step S40, the index coefficient relating to the target pixel of the brightness signal is inputted.

At Step S41, the index coefficient is compared with a predetermined threshold value Th1, and if the index coefficient is not more than the threshold value Th1, the routine branches to Step S42, while if the index coefficient is more than the threshold value Th1, the routine branches to Step S43.

At Step S42, a signal subjected to the first noise reduction processing is outputted and finished.

At Step S43, the index coefficient is compared with a predetermined threshold value Th2, and if the index coefficient is not smaller than the threshold value Th1, the routine branches to Step S44, while if the index coefficient is smaller than the threshold value Th2, the routine branches to Step S45.

At Step S44, a signal subjected to the second noise reduction processing is outputted and finished.

At Step S45, a lookup table with the index coefficient as an input and a combination coefficient as an output shown in FIG. 10 is inputted.

At Step S46, the combination coefficient is outputted on the basis of the index coefficient.

At Step S100, the brightness signal subjected to the first noise reduction processing is multiplied by (1-combination coefficient).

At Step S101, the brightness signal subjected to the second noise reduction processing is multiplied by the combination coefficient.

At Step S102, a signal obtained by multiplying the signal subjected to the first noise reduction processing by the (1-combination coefficient) and a signal obtained by multiplying the brightness signal subjected to the second noise reduction processing by the combination coefficient are added together.

At Step S103, the color difference signal subjected to the first noise reduction processing is multiplied by (1-combination coefficient).

At Step S104, the color difference signal subjected to the second noise reduction processing is multiplied by the combination coefficient.

At Step S105, a signal obtained by multiplying the color difference signal subjected to the first noise reduction processing by (1-combination coefficient) and a signal obtained by multiplying the color difference signal subjected to the second noise reduction processing by the combination coefficient are added together.

At Step S50, the combined brightness and color difference signals are outputted and the routine is finished.

As mentioned above, it may be so configured that the signal processing is performed by software, and the same working effects as the processing by hardware can be exerted.

The embodiments of the present invention have been described, but the embodiments illustrate only application examples of the present invention and do not limit the technical scope of the present invention to the specific configurations of the embodiments.

What is claimed is:

1. A noise reduction system for performing noise reduction processing for an image signal taken in from an image pickup system, comprising:
   a local area extracting unit which sequentially extracts, from the image signal, a local area including a target pixel for which the noise reduction processing is performed;
   a first noise reducing unit which reduces random noise for the local area;
   a second noise reducing unit which reduces impulsive noise for the local area and includes an index coefficient calculating unit which is configured to calculate an index coefficient indicating a degree of impulsiveness concerning at least one pixel of the local area; and
   a combining unit which combines an image signal obtained by the first noise reducing unit and an image signal obtained by the second noise reducing unit.,
   wherein the combining unit has a selecting unit which is configured to select the image signal obtained by the second noise reducing unit from the image signal obtained by the first noise reducing unit and the image signal obtained by the second noise reducing unit if the index coefficient is not less than a predetermined threshold value.

2. The noise reduction system according to claim 1, wherein
   the first noise reducing unit has:
   a low frequency extracting unit which extracts a low frequency component from the local area;
   a noise estimating unit which estimates a noise amount to the target pixel on the basis of the low frequency component; and
   a smoothing unit which performs smoothing processing for the target pixel on the basis of at least one of the low frequency component and the noise amount.

3. The noise reduction system according to claim 2, wherein
   the low frequency extracting unit has an average value calculating unit which calculates an average value from the local area.

4. The noise reduction system according to claim 2, wherein
   the low frequency extracting unit has a low pass filter unit which applies a low pass filter to the local area.

5. The noise reduction system according to claim 2, wherein
   the low frequency extracting unit has a bilateral filter unit which applies a bilateral filter to the local area.

6. The noise reduction system according to claim 2, wherein
   the noise estimating unit has:
   a collecting unit which collects information concerning a temperature value and a gain to the image signal of the image pickup system;
   a giving unit which gives a standard value to information which cannot be obtained by the collecting unit;
   a parameter recording unit which records a parameter group concerning a reference noise model;
   a parameter selecting unit which selects a required parameter from the parameter group on the basis of the information from the collecting unit or the giving unit and a low frequency component of the local area; and
   an interpolating unit which acquires a noise amount of the target pixel by an interpolation calculation on the basis of the low frequency component of the local area and the selected parameter.

7. The noise reduction system according to claim 2, wherein
   the noise estimating unit has:
   a collecting unit which collects information concerning a temperature value and a gain to the image signal of the image pickup system;
   a giving unit which gives a standard value to information which cannot be obtained by the collecting unit; and
   a noise table unit which outputs a noise amount of the target pixel using the information from the collecting unit or the giving unit and the low frequency component of the local area as an input.

8. The noise reduction system according to claim 2, wherein
   the smoothing unit has a coring unit which performs coring processing to the target pixel on the basis of the low frequency component of the local area and the noise amount.

9. The noise reduction system according to claim 2, wherein
the smoothing unit has:
a filter recording unit which records a plurality of filters having predetermined frequency characteristics;
a filter selecting unit which selects the filter on the basis of the noise amount; and
a frequency filter unit which performs filtering processing using the selected filter for the local area.

10. The noise reduction system according to claim 1, wherein
the second noise reducing unit has
an index coefficient calculating unit which calculates an index coefficient indicating a degree of impulsiveness concerning each pixel of the local area;
a weighting coefficient calculating unit which calculates a weighting coefficient concerning each pixel of the local area on the basis of the index coefficient; and
a weighting filter unit which performs filtering processing for the local area on the basis of the weighting coefficient.

11. The noise reduction system according to claim 10, wherein
the combining unit has:
a second selecting unit which selects an image signal subjected to noise reduction processing by the first noise reducing unit if the index coefficient is not more than a predetermined first threshold value;
the selecting unit which selects an image signal subjected to noise reduction processing by the second noise reducing unit if the index coefficient is not less than a predetermined second threshold value; and
a weighted adding unit which weights addition of the image signal subjected to the noise reduction processing by the first noise reducing unit and the image signal subjected to the noise reduction processing by the second noise reducing unit if the index coefficient is more than a second threshold value and less than the predetermined threshold value.

12. The noise reduction system according to claim 10, wherein
the index coefficient calculating unit has:
a difference unit which calculates absolute values of differences between a pixel for which the index coefficient is to be calculated and a predetermined number of pixels located in the vicinity thereof; and
a total sum calculating unit which calculates the total sum of the absolute values of differences.

13. The noise reduction system according to claim 10, wherein
the index coefficient calculating unit has:
a difference unit which calculates absolute values of differences between a pixel for which the index coefficient is to be calculated and a predetermined number of pixels located in the vicinity thereof;
a sorting unit which rearranges the absolute values of differences in the order of size; and
a total sum calculating unit which calculates the total sum of a predetermined number of the rearranged absolute values of differences from the smallest value.

14. The noise reduction system according to claim 10, wherein
the weighting coefficient calculating unit has a weighting coefficient table unit which outputs a weighting coefficient on the basis of the index coefficient.

15. The noise reduction system according to claim 1, wherein
the second noise reducing unit has:
an index coefficient calculating unit which calculates an index coefficient indicating a degree of impulsiveness concerning each target pixel of the local area; and
a non-linear filter unit which performs nonlinear filtering processing for the local area on the basis of the index coefficient.

16. The noise reduction system according to claim 15, wherein
the combining unit has:
a first selecting unit which selects an image signal subjected to noise reduction processing by the first noise reducing unit if the index coefficient is not more than a predetermined first threshold value;
a second selecting unit which selects an image signal subjected to noise reduction processing by the second noise reducing unit if the index coefficient is not less than a predetermined second threshold value; and
a weighted adding unit which weights addition of the image signal subjected to the noise reduction processing by the first noise reducing unit and the image signal subjected to the noise reduction processing by the second noise reducing unit if the index coefficient is more than the first threshold value and less than the second threshold value.

17. The noise reduction system according to claim 15, wherein
the index coefficient calculating unit has:
a difference unit which calculates absolute values of differences between a pixel for which the index coefficient is to be calculated and a predetermined number of pixels located in the vicinity thereof; and
a total sum calculating unit which calculates the total sum of the absolute values of differences.

18. The noise reduction system according to claim 15, wherein
the index coefficient calculating unit has
a difference unit which calculates absolute values of differences between a pixel for which the index coefficient is to be calculated and a predetermined number of pixels located in the vicinity thereof;
a sorting unit which rearranges the absolute values of differences in the order of size; and
a total sum calculating unit which calculates the total sum of a predetermined number of the rearranged absolute values of differences from the smallest value.

19. The noise reduction system according to claim 15, wherein
the non-linear filtering unit uses median filtering processing as the non-linear filtering processing.

20. The noise reduction system according to claim 1, wherein
the image pickup system uses an image pickup element having a color filter arranged on a front face and has:
a color signal separating unit which separates the image signal to a plurality of color signals for each color filter used by the image pickup element; and
a signal control unit which executes control so that the local area extracting unit, the first noise reducing unit as well as the second noise reducing unit, and the combining unit are sequentially applied for each color signal.

21. The noise reduction system according to claim 20, wherein
the image pickup element is an image pickup element in which R (red), G (green), B (blue) Bayer type primary color filter is arranged on a front face thereof or Cy (cyan), Mg (magenta), Ye (yellow), G (green) color difference line sequential complementary filter is arranged on the front face thereof.

22. The noise reduction system according to claim 1, wherein
the image pickup system uses an image pickup element having a color filter arranged on a front face and has:
a brightness color difference separating unit which separates a brightness signal and a color difference signal from the image signal; and a signal control unit which executes control so that the local area extracting unit, the first noise reducing unit as well as the second noise reducing unit, and the combining unit are sequentially applied for each of the brightness signal and color difference signal; and
the second noise reducing unit and the combining unit process the color difference signal on the basis of the processing result of the brightness signal.

23. The noise reduction system according to claim 22, wherein
the image pickup element is an image pickup element in which R (red), G (green), B (blue) Bayer type primary color filter is arranged on a front face thereof or Cy (cyan), Mg (magenta), Ye (yellow), G (green) color difference line sequential complementary filter is arranged on the front face thereof.

24. An image pickup system comprising:
an image pickup system;
an image signal storage unit which takes in an image signal photographed by the image pickup system; and
a noise reduction system according to claim 1, wherein noise reduction processing is performed by the noise reduction system for the taken-in image signal:,
a combining unit which combines an image signal obtained by the first noise reducing unit and an image signal obtained by the second noise reducing unit.,
wherein the combining unit has a second selecting unit which is configured to select the image signal obtained by the second noise reducing unit from the image signal obtained by the first noise reducing unit and the image signal obtained by the second noise reducing unit if the index coefficient is not less than a predetermined threshold value.

25. A non-transitory computer readable storage medium stored with a noise reduction program for causing a computer to execute noise reduction processing for an image signal taken in from an image pickup system, wherein the computer program comprises:
a local area extraction step for sequentially extracting a local area including a target pixel for which noise reduction processing is to be performed from the image signal;
a first noise reduction step for reducing random noise for the local area; a second noise reduction step for reducing impulsive noise for the local area, the second noise reducing step including an index coefficient calculating step for calculating an index coefficient indicating a degree of impulsiveness concerning at least one pixel of the local area; and
a combination step for combining an image signal obtained by the first noise reduction step and an image signal obtained by the second noise reduction step;
wherein selection of the image signal is obtained by the second noise reducing unit from the image signal obtained by the first noise reducing unit and the image signal obtained by the second noise reducing unit if the index coefficient is not less than a predetermined threshold value.

26. A non-transitory computer readable storage medium according to claim 25, wherein the first noise reduction step has: a low frequency extraction step for extracting a low frequency component from the local area; a noise estimation step for estimating a noise amount to the target pixel on the basis of the low frequency component; and a smoothing step for performing smoothing processing for the target pixel on the basis of at least one of the low frequency component and the noise amount.

27. A non-transitory computer readable storage medium according to claim 25, wherein the second noise reduction step has: an index coefficient calculation step for calculating an index coefficient indicating a degree of impulsiveness concerning each pixel of the local area; a weighting coefficient calculation step for calculating a weighting coefficient concerning each pixel of the local area on the basis of the index coefficient; and a weighted filter step for performing filtering processing to the local area on the basis of the weighting coefficient.

28. A non-transitory computer readable storage medium according to claim 27, wherein
the index coefficient calculation step has: a difference step for calculating absolute values of differences between a pixel for which an index coefficient is to be calculated and a predetermined number of pixels located in the vicinity thereof;
a sort step for rearranging the absolute values of differences in the order of size; and
a total sum calculation step for calculating the total sum of the predetermined number of the rearranged absolute values of differences from the smallest value.

29. A non-transitory computer readable storage medium according to claim 27, wherein
the combination step has:
a first selection step for selecting an image signal subjected to noise reduction processing at the first noise reduction step if the index coefficient is not more than a predetermined first threshold value;
a second selection step for selecting an image signal subjected to noise reduction processing at the second noise reduction step if the index coefficient is not less than a predetermined threshold value; and
a weighted addition step for weighted addition of the image signal subjected to the noise reduction processing at the first noise reduction step and the image signal subjected to the noise reduction processing at the second noise reduction step if the index coefficient is more than the first threshold value and less than the predetermined threshold value.

30. A non-transitory computer readable storage medium according to claim 25, wherein
the second noise reduction step has:
an index coefficient calculation step for calculating an index coefficient indicating a degree of impulsiveness concerning a target pixel of the local area; and
a non-linear filtering step for performing non-linear filtering processing to the local area on the basis of the index coefficient.

31. A non-transitory computer readable storage medium according to claim 30, wherein
the index coefficient calculation step has:
a difference step for calculating absolute values of differences between a pixel for which an index coefficient is to be calculated and a predetermined number of pixels located in the vicinity thereof;

a sort step for rearranging the absolute values of differences in the order of size; and a total sum calculation step for calculating the total sum of the predetermined number of the rearranged absolute values of differences from the smallest value.

32. A non-transitory computer readable storage medium according to claim 30, wherein the combination step has:

a first selection step for selecting an image signal subjected to noise reduction processing at the first noise reduction step if the index coefficient is not more than a predetermined first threshold value;

a second selection step for selecting an image signal subjected to noise reduction processing at the second noise reduction step if the index coefficient is not less than a predetermined second threshold value; and a weighted addition step for weighted addition of the image signal subjected to the noise reduction processing at the first noise reduction step and the image signal subjected to the noise reduction processing at the second noise reduction step if the index coefficient is more than the first threshold value and less than the second threshold value.

* * * * *